United States Patent
Jung et al.

(10) Patent No.: US 10,917,820 B2
(45) Date of Patent: Feb. 9, 2021

(54) WIRELESS COMMUNICATION DEVICE AND CONTROL METHOD THEREFOR

(71) Applicant: Samsung Electronics Co., Ltd., Gyeonggi-do (KR)

(72) Inventors: Doyoung Jung, Gyeonggi-do (KR); Changyeul Kwon, Gyeonggi-do (KR); Joosoon Kim, Gyeonggi-do (KR); Ilju Na, Gyeonggi-do (KR); Yoonjo Oh, Seoul (KR); Sukjin Yun, Seoul (KR); Sungrok Yoon, Seoul (KR); Wonsup Cho, Gyeonggi-do (KR); Suyoung Park, Gyeonggi-do (KR); Sungchul Park, Seoul (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/339,532

(22) PCT Filed: Mar. 14, 2017

(86) PCT No.: PCT/KR2017/002721
§ 371 (c)(1),
(2) Date: Apr. 4, 2019

(87) PCT Pub. No.: WO2018/066777
PCT Pub. Date: Apr. 12, 2018

(65) Prior Publication Data
US 2020/0053606 A1 Feb. 13, 2020

(30) Foreign Application Priority Data

Oct. 4, 2016 (KR) ........................ 10-2016-0127869
Feb. 10, 2017 (KR) ........................ 10-2017-0018452

(51) Int. Cl.
*H04W 36/00* (2009.01)
*H04W 72/04* (2009.01)
(Continued)

(52) U.S. Cl.
CPC ....... *H04W 36/0066* (2013.01); *H04W 24/10* (2013.01); *H04W 36/0044* (2013.01);
(Continued)

(58) Field of Classification Search
CPC .... H04B 1/38; H04W 24/10; H04W 36/0044; H04W 36/0066; H04W 36/14;
(Continued)

(56) References Cited

U.S. PATENT DOCUMENTS

| 2011/0228749 A1 | 9/2011 | Taghavi Nasrabadi et al. |
| 2012/0190402 A1 | 7/2012 | Whang et al. |

(Continued)

FOREIGN PATENT DOCUMENTS

| KR | 1020120085635 | 8/2012 |
| KR | 1020120091367 | 8/2012 |

(Continued)

OTHER PUBLICATIONS

PCT/ISA/210 Search Report issued on PCT/KR2017/002721 (pp. 5).
PCT/ISA/237 Written Opinion issued on PCT/KR2017/002721 (pp. 7).

*Primary Examiner* — Kan Yuen
(74) *Attorney, Agent, or Firm* — The Farrell Law Firm, P.C.

(57) ABSTRACT

The disclosure relates to a wireless communication device and a method for controlling the same and, particularly, to a wireless communication device capable of communicating in different frequency bands, and a method for controlling the same.

A method according to an embodiment of the disclosure corresponds to a method for controlling a wireless communication device having a wireless communication unit in accordance with each of a plurality of wireless communi- (Continued)

cation standards. The method may comprise the steps of: receiving a first control signal from a first network by a first communication processor which communicates in a first wireless standard mode; controlling, by the first communication processor, power of a second communication processor of a second wireless standard mode to be turned on when the first control signal includes system control information of the second wireless standard mode; transferring, by the first communication processor, control information to be used in a system of the second wireless standard mode to the second communication processor through a data communication interface when data received from a system of the first wireless standard mode includes the control information to be used in the system of the second wireless standard mode; and accessing and communicating with the system of the second wireless standard mode by the second communication processor.

The present research has been conducted with the support of the "Cross-Department Giga KOREA Project" of the Ministry of Science, ICT and Future Planning.

6 Claims, 27 Drawing Sheets

(51) Int. Cl.
*H04W 76/27* (2018.01)
*H04W 92/20* (2009.01)
*H04W 24/10* (2009.01)

(52) U.S. Cl.
CPC ....... *H04W 72/0426* (2013.01); *H04W 76/27* (2018.02); *H04W 92/20* (2013.01)

(58) Field of Classification Search
CPC ......... H04W 52/0209; H04W 52/0235; H04W 72/0426; H04W 76/27; H04W 88/06; H04W 92/20
See application file for complete search history.

(56) References Cited

U.S. PATENT DOCUMENTS

| | | |
|---|---|---|
| 2013/0028178 A1 | 1/2013 | Comeau |
| 2013/0326188 A1 | 12/2013 | Suh et al. |
| 2016/0066339 A1 | 3/2016 | Jakoby et al. |
| 2016/0112925 A1 | 4/2016 | Qin |
| 2016/0128128 A1* | 5/2016 | Ang ................ H04W 52/0222 370/311 |
| 2016/0192412 A1* | 6/2016 | Cho ................ H04W 72/1215 455/552.1 |
| 2016/0212737 A1 | 7/2016 | Jang et al. |

FOREIGN PATENT DOCUMENTS

| | | |
|---|---|---|
| KR | 1020160021184 | 2/2016 |
| WO | WO 2013/017965 | 2/2013 |
| WO | WO 2016/114641 | 7/2016 |

* cited by examiner

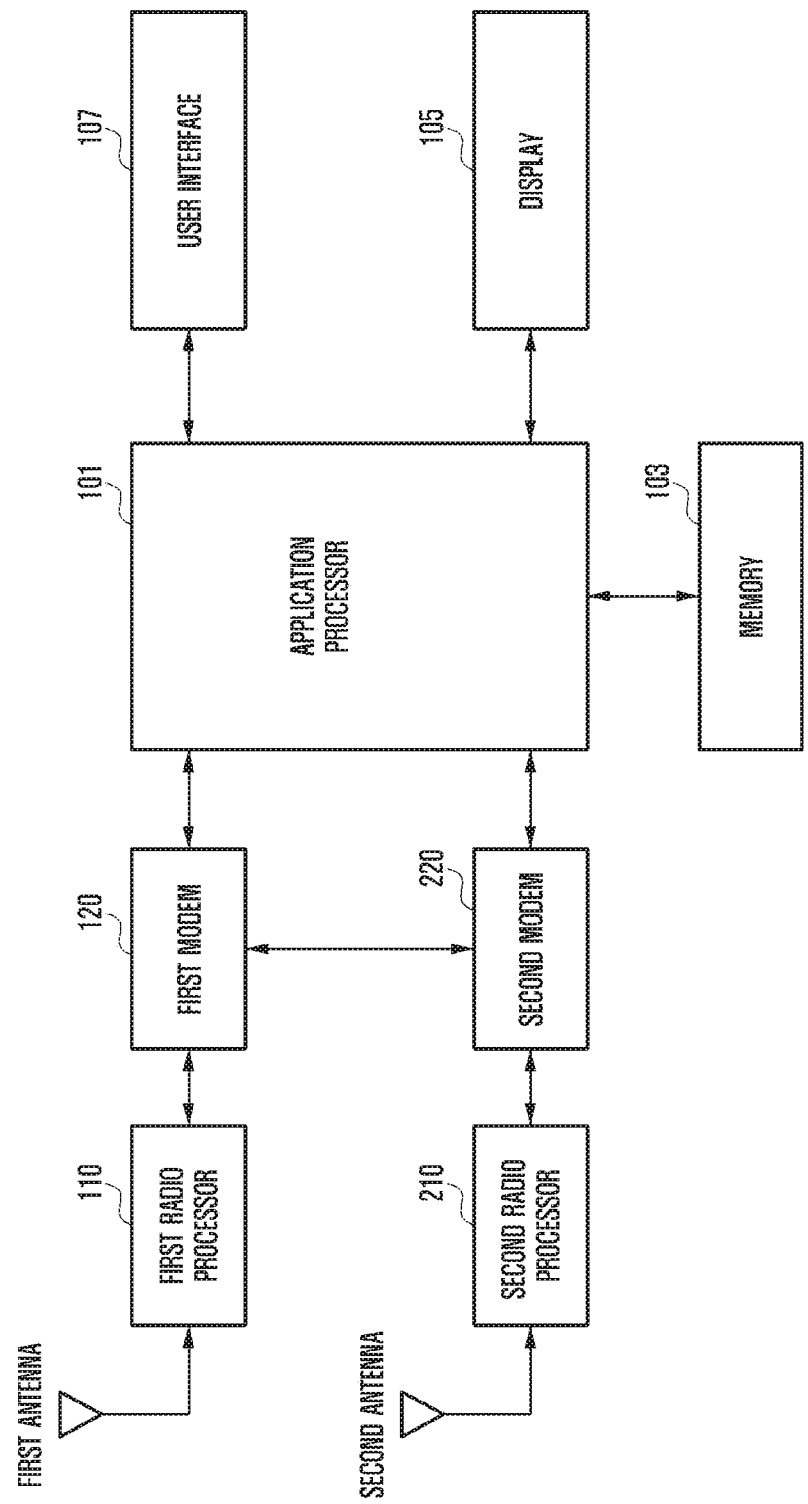

WIRELESS COMMUNICATION DEVICE AND CONTROL METHOD THEREFOR

PRIORITY

This application is a National Phase Entry of PCT International Application No. PCT/KR2017/002721 which was filed on Mar. 14, 2017, and claims priority to Korean Patent Application Nos. 10-2016-0127869 and 10-2017-0018452, which were filed on Oct. 4, 2016 and Feb. 10, 2017, respectively, the content of each of which is incorporated herein by reference.

TECHNICAL FIELD

Various embodiments of the disclosure relate to a wireless communication device and a method for controlling the same, and, more particularly, to a wireless communication device capable of communicating in different frequency bands, and a method for controlling the same.

BACKGROUND ART

As a representative technology in the field of wireless communication, there is a cellular communication method. The cellular communication system has evolved from the first generation to the fourth generation cellular communication system. Cellular modems, which are in charge of each generation when a cellular network is upgraded between generations, have been mainly mounted in a terminal as a separate chip. In the commercialization process, the modems for each generation are subjected to a one-chip process to be mounted in one chip. In addition, the one-chip process of mounting the modems for each generation in one chip is performed along with an one-chip process of constituting a modem chip and an application processor (AP) chip as one chip, which has ultimately evolved into a form of a modem & application processor (MoDAP) in which AP chips are incorporated into modem chips.

DISCLOSURE OF INVENTION

Technical Problem

In the evolution to the fourth-generation cellular system, the modem chips for each generation was mounted in one wireless communication device through the one-chip process of constituting the modem chips for each generation as one chip. For example, when the system evolves from a second-generation cellular system to a third-generation cellular system, the second-generation modem chip and the third-generation modem chip are configured in one chip. In addition, when the system evolves into a fourth-generation cellular system, the third-generation modem chip and the fourth-generation modem chip are mounted in one chip to be mounted in a wireless communication device.

On the other hand, in the next generation cellular system after the fourth generation, that is, in the 5th generation (5G), it is expected to use a different mmWave from the previous wireless communication band. Therefore, the 5G modem chip has too different characteristics from those of the existing generation in terms of the radio frequency (RF), so that the 5G modem chip is difficult to be one chip together with the existing generation, that is, the fourth generation (4G) modem chip or the third generation (3G) modem chip.

Also, since the 5G modem is difficult to be one chip, the structure of hardware and software for interworking with the existing generation modem, that is, the 4G modem is not defined.

To solve these problems, the disclosure provides a method for interworking between modem chips having different hardware configurations and a control device therefor.

In addition, the disclosure provides a method for interworking between modem chips and application processors having different hardware configurations and a control device therefor.

Solution to Problem

A method according to an embodiment of the disclosure corresponds to a method for controlling a wireless communication device having each of a wireless communication unit in accordance with a plurality of wireless communication standards. The method may comprise the steps of: receiving a first control signal from a first network by a first communication processor which communicates in a first wireless standard mode; controlling, by the first communication processor, power of a second communication processor of a second wireless standard mode to be turned on when the first control signal includes system control information of the second wireless standard mode; transferring, by the first communication processor, control information to be used in a system of the second wireless standard mode to the second communication processor through a data communication interface when data received from a system of the first wireless standard mode includes the control information to be used in the system of the second wireless standard mode; and accessing and communicating with the system of the second wireless standard mode by the second communication processor.

A device according to an embodiment of the disclosure includes a first wireless unit configured to up-convert a baseband signal to be transmitted according to a first wireless standard into a signal of a first frequency band and transmitting the signal to a first antenna, and converting the signal of the first frequency band received from the first antenna into the signal of the baseband and outputting the signal; a second wireless unit configured to up-convert a baseband signal to be transmitted according to a second wireless standard into a signal of a second frequency band and transmitting the signal to a second antenna, and converting the signal of the second frequency band received from the second antenna into the signal of the baseband and outputting the signal; a first communication processor configured to modulate and encode data to be transmitted to the first wireless unit to generate the baseband signal to be transmitted and demodulate and decode the baseband signal received from the first wireless unit; a second communication processor configured to modulate and encode data to be transmitted to the second wireless unit to generate the baseband signal to be transmitted and demodulate and decode the baseband signal received from the second wireless unit; and a data communication interface configured to transmit and receive data between the first communication processor and the second communication processor.

The first communication processor may control the second communication processor to be turned on/off based on system information of a second wireless standard mode on data received from a system of a first wireless standard mode.

Advantageous Effects of Invention

The cellular wireless communication device according to the disclosure can perform the smooth communication in the 4G and 5G, and at the same time provide the method for interworking between the modem chip and the processor as well as between the modem chips having different hardware configurations to perform the smooth communication.

BRIEF DESCRIPTION OF DRAWINGS

FIG. 1 is a functional internal block configuration diagram of a wireless communication device to which the disclosure is applied.

MODE FOR THE INVENTION

Figure 2A:
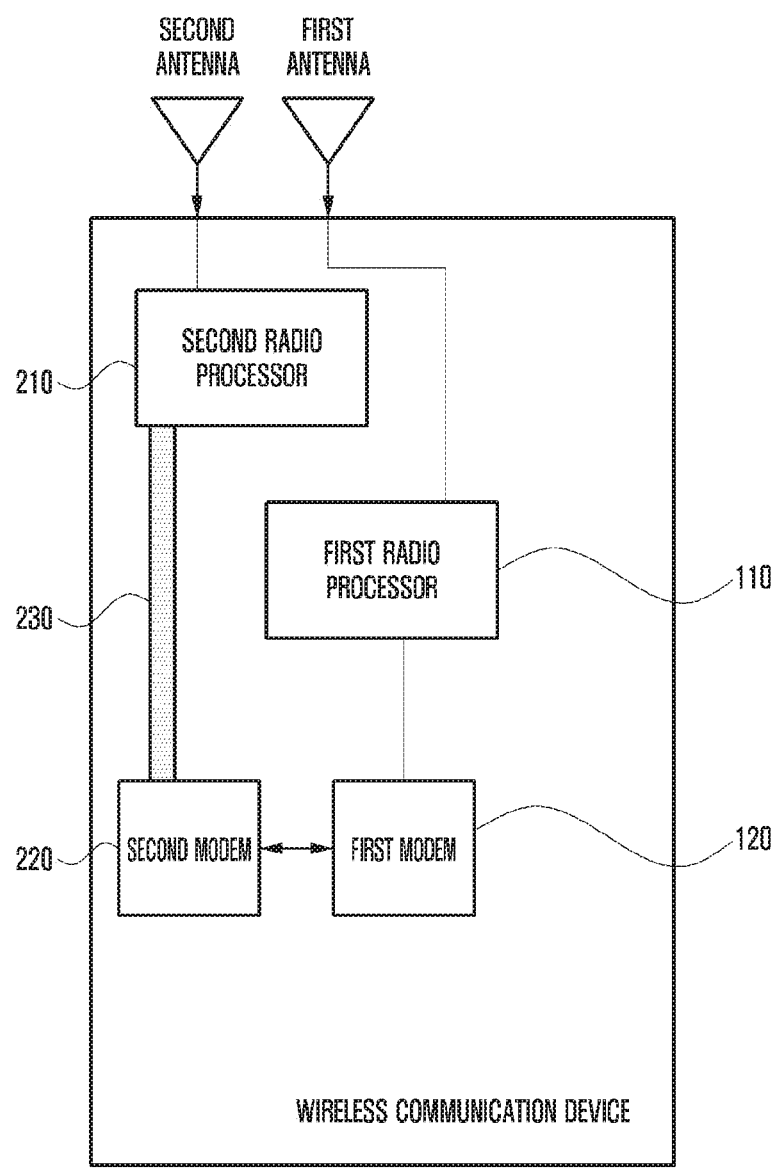
FIGS. 2A to 2C are diagrams illustrating a mounting form of each module in the wireless communication device supporting 5G and 4G according to the disclosure.

Hereinafter, various embodiments of the disclosure will be described in detail with reference to the accompanying drawings. At this time, it is to be noted that like reference numerals denote like elements in the accompanying drawings. Further, the accompanying drawings of the disclosure are provided to help understanding of the disclosure, and therefore it is to be noted that the disclosure is not limited to forms, dislocations, etc., illustrated in the drawings of the disclosure. Further, detailed descriptions related to well-known functions or configurations will be ruled out in order not to unnecessarily obscure the subject matter of the disclosure. It is to be noted that only parts necessary to understand operations according to various embodiments of the disclosure will be described below and the description of other parts will be omitted so as not to unnecessarily obscure the subject matter of the disclosure.

FIG. 1 is a functional internal block configuration diagram of a wireless communication device to which the disclosure is applied.

Referring to FIG. 1, a wireless communication device may include a first antenna, a first radio processor 110, a first modem 120, an application processor 101, a memory 103, a display 105, and a user interface 107. In addition, the wireless communication device may further include a second antenna, a second radio processor 210, and a second modem 220.

In the following description, the first antenna, the first radio processor 110, and the first modem 120 may be configured to process wireless signals of a fourth generation or previous generations including the fourth generation, for example, a first generation, a second generation, a third generation and a fourth generation. In addition, the first modem 120 may process some of frequency bands of the fifth generation. For example, the first modem may be configured to receive and process a signal of a frequency band that can be processed by the first modem 120 among frequency bands used in the fifth generation system.

In addition, the second antenna, the second radio processor 210, and the second modem 220 may be configured to process the wireless signals of the fifth generation. In this case, when the first modem 120 is configured to be able to process some of the fifth-generation frequency bands as described above, the second modem 220 may be configured to process a signal in a band that can not be processed by the first modem, for example, a 28 GHz band, and may be configured to process the entire fifth-generation frequency band regardless of the configuration of the first modem 120. Hereinafter, it will be assumed that the first modem 120 processes the wireless signals of the previous generations, including the fourth generation. In addition, the case where the second modem 220 processes the fifth-generation wireless signal is assumed. However, as described above, the first modem 120 may be configured to process some of the frequency bands of the fifth generation. In addition, the first modem 120 and the second modem 220 may each be included in one communication processor, and the first modem 120 and the second modem 220 may each be implemented as a single communication processor. Hereinafter, for convenience of description, description will be made using the expression of the modem instead of the expression of the communication processor.

In one embodiment, the first radio processor 110 may up-convert the cellular signals of the previous generations including the fourth generation and send out the up-converted cellular signals through the first antenna, or may convert a signal received from the first antenna into a baseband signal and provide the baseband signal to the first modem 120. In the following description, for convenience of description, the cellular modes of the previous generations including the fourth generation will be collectively referred to as a fourth-generation wireless communication mode. The first modem 120 encodes and modulates data to be transmitted according to the fourth-generation cellular communication mode, provides the data to the first radio processor 110, and demodulates and decodes the baseband signal received from the first radio processor 110.

Meanwhile, in one embodiment, the second radio processor 210 may up-convert cellular signals of the fifth generation and send out the up-converted cellular signals through the second antenna, or may convert a signal received from the second antenna into a baseband signal and provide the baseband signal to the second modem 220. The second modem 220 encodes and modulates data to be transmitted according to the fifth-generation cellular communication mode, provides the data to the second radio processor 210, and demodulates and decodes the baseband signal received from the second radio processor 210.

The application processor (AP) 101 may perform a control for cellular communication, and may further include a control for interworking between the first modem 120 and the second modem 220 or a configuration for the interworking according to the disclosure. In addition, the control performed in the application processor 101, the configuration for the interworking, or the control operation will be described in more detail with reference to the following drawings.

The memory 103 may store various data and/or user data and the like for controlling the wireless communication device, may be implemented in a volatile memory, a nonvolatile memory, or both the volatile memory and the nonvolatile memory, and may be implemented in various forms such as an internal memory or an external memory connected to the internal memory via a predetermined interface (not illustrated). In the disclosure, there is no restriction on the forms, the characteristics and the like of the memory 103.

The display 105 may be implemented in various forms for providing various information of the wireless communication device to the user. For example, the display 105 of the wireless communication device according to the disclosure may be implemented in any form, such as various LED panel forms, an LCD panel form, hologram, and a flexible display that can provide a graphical user interface to a user as well as a simple LED lamp form.

The user interface 107 is a device which allows a user to provide a user's input to a wireless communication device, and may be various types of input devices such as a user's touch, a gesture, a gesture using a specific tool, for example, a pen or the like, and a voice input. In the disclosure, there is no particular restriction on an input mode of the user interface 107, the implementation form of the input device, or the like and therefore any form can be implemented.

Also, although not shown in the example of FIG. 1, the wireless communication device may include various sensors. If an example of the wireless communication device is a smart phone, the smart phone may include various types of sensors such as a proximity sensor, a position sensor, a geomagnetic sensor, an illuminance sensor, and a biometric sensor. Such sensors may be configured to transfer sensed information to modems or application processors. Such a configuration will be described in more detail with reference to drawings to be described below.

The embodiment of FIG. 1 illustrates a general configuration of the wireless communication device, and may further include various configurations other than forms illustrated in FIG. 1, and it is noted that the wireless communication device can be configured not to include the user interface 107, the display 105, or both the user interface 107 and the display 105 according to the characteristics of the wireless communication device.

Meanwhile, the disclosure illustrates that the 5G cellular communication uses a millimeter Wave (mmWave) and thus the wire wireless communication device that performs both the 4G cellular communication and the 5G cellular communication have different antennas, radio processors, and different modems. In a wireless communication device having such a configuration, when the respective modules are actually implemented as one electronic device, there is a significant restriction on the mounting of the respective modules due to the characteristics of mmWave.

Figure 2B:
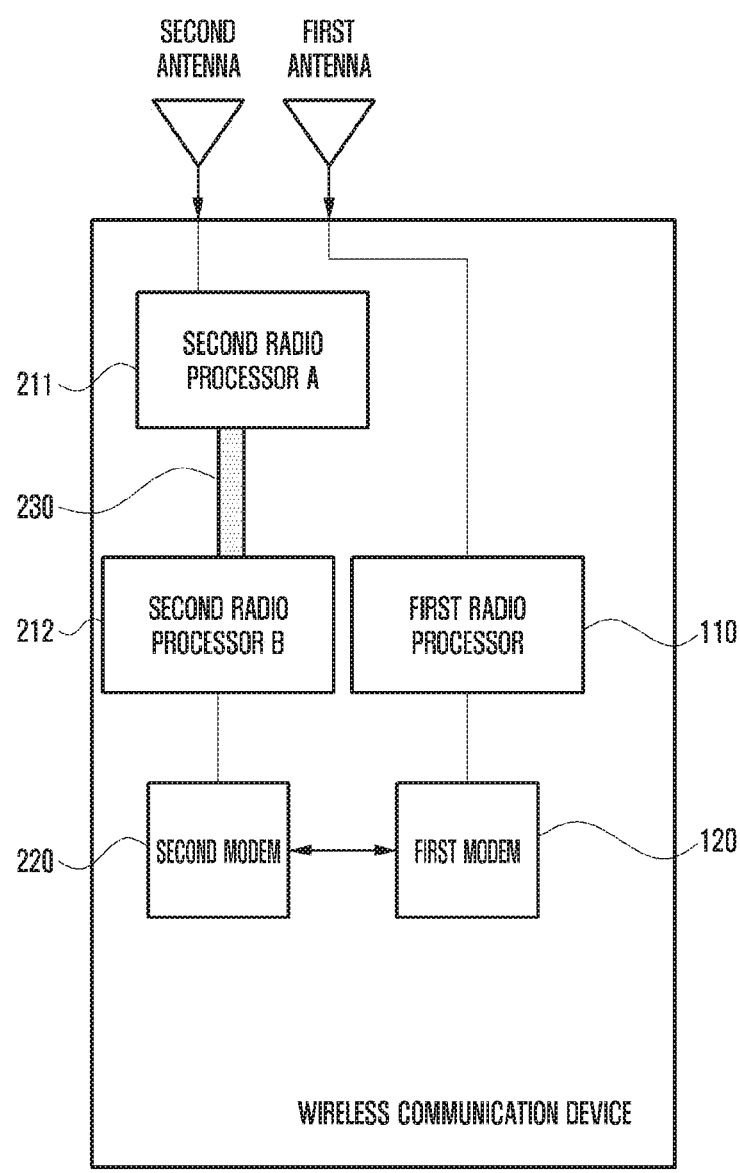
Figure 2C:
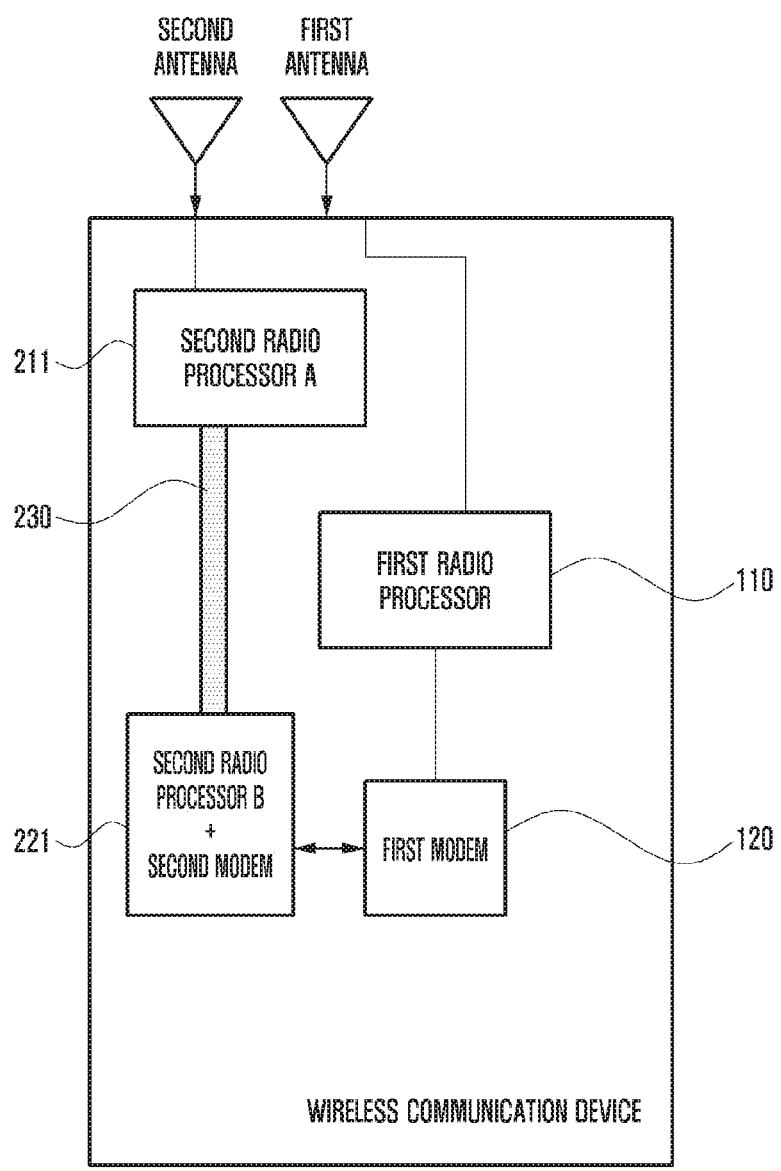

FIGS. 2A to 2C are diagrams illustrating a mounting form of each module in the wireless communication device supporting 5G and 4G according to the disclosure.

Referring first to FIG. 2A, the wireless communication device includes a first antenna and a second antenna, and illustrates the first radio processor 110, the first modem 120, the second radio processor 210, and the second modem 220. As illustrated in FIG. 2A, since the second radio processor 210 for processing the signals of the 5G cellular communication system uses mmWave, the distance between the second radio processor 210 and the second antenna is limited. The reason is that when the distance between the antenna and the radio processor is far from each other upon using the mmWave, a transmission path loss is greatly increased, and the intensity of the signal transferred to the antenna may be reduced accordingly. Here, the distance between the antenna and the radio processor is only a value exemplified in one embodiment, and is not limited to the above values. For example, it is noted that the distance between the antenna and the radio processor may somewhat vary depending on the characteristics of the frequency used and the characteristics of the radio processor.

Therefore, it is preferable that the second radio processor 210 is disposed at a position very close to the second antenna in FIG. 2A. Accordingly, other modules, for example, the first radio processor 110, the first modem 120, and the second modem 220 may be disposed in the wireless communication device in consideration of the arrangement with other modules after the second radio processor 210 is disposed.

The block configuration shown in FIG. 2A is a diagram illustrating a form in which the wireless communication device directly converts the frequency to the mmWave frequency band. That is, the baseband signal is directly converted to a 5G frequency band without conversion into an intermediate frequency (IF) band. If a superheterodyne scheme is used, it can be configured as shown in FIG. 2B. In FIG. 2, reference numeral 230 denotes a cable for connecting between the second radio processor 210 and the second modem 220. This is a configuration for preventing a signal loss because the wireless frequency band of the 5G network is a very high band.

Referring to FIG. 2B, a second radio processor a 211 and a second radio processor b 212 of FIG. 2B correspond to the second radio processor 210 of FIG. 2A. Other configurations may have the same configuration as in FIG. 2A. In FIG. 2B, since the superheterodyne scheme is used, the two-step processing of up-converting the baseband signal output from the second modem 220 into the intermediate frequency (IF) in the second radio processor b 212, and converting into the signal of the 5G band in the second radio processor a 211 is performed. The signal received from the second antenna is down-converted into an intermediate frequency (IF) in the second radio processor a 211 and is down-converted into the baseband signal in the second radio processor b 212 to be provided to the second modem 220. At this time, the connection from the second radio processor a 211 to the second radio processor b 212 can use the cable 230 to prevent a signal loss when the frequency band of the IF is high. For example, the frequency band of the IF may be 10 GHz or higher. In addition, the connection to the second modem 220 may take a general form when the frequency band is sufficiently lowered in the second radio processor b 212. Therefore, the configuration of FIG. 2A and the configuration of FIG. 2B are merely the difference between the direct conversion scheme that does not use the intermediate frequency and the superheterodyne scheme that uses the intermediate frequency. In addition, it may also be configured to perform the conversion from the second modem to the intermediate frequency together in some cases.

FIG. 2C illustrates the case where the second modem and the second radio processor b are configured as one module 221. In this case, as illustrated in FIGS. 2A and 2B, it is preferable that the second radio processor a 211 is disposed within a preset distance from the second antenna. In addition, the connection between the second radio processor a 211 and the second modem 221 including the second radio processor b may be connected by a cable.

If the distance between the antenna of the 5G band and the radio processor is arranged within the preset distance, the wireless communication device may not be a problem when the size of the wireless communication device is very large. However, in general, in the case of the wireless communication device using the 4G cellular communication and the 5G cellular communication, it is generally configured in a portable or wearable form. Therefore, since the size of the wireless communication device is limited in the portable or wearable wireless communication device, the modules illustrated in the form in FIGS. 2A to 2C or the modules illustrated in FIGS. 2A to 2C may be stacked or overlapped in whole or in part on a three dimension. In other words, only the form in which the modules are arranged in a planar manner is illustrated in FIGS. 2A to 2C, but when each module can be overlappingly arranged in a three-dimensional manner, a specific module may overlap on top of another module.

As described above, it is first possible to define what interworking between 5G and 4G should occur in the two-chip environment in which the hardware of the modem is separated in the wireless communication device. In the cellular system, when the 5G band, that is, the mmWave is used, the communication is performed in the high frequency band, and therefore, linearity is strong and diffraction is not good. Therefore, it is desirable to perform beamforming in order to perform communication with the specific wireless communication device. Since the frequency band of the 5G system is a very high frequency band, there is a high possibility that a link is disconnected when an obstacle or a wireless communication device moves. Therefore, in the control plane where it is most important to secure a reliable communication channel, it is easier to secure a reliable communication channel by using the low band 4G.

Figure 3A:
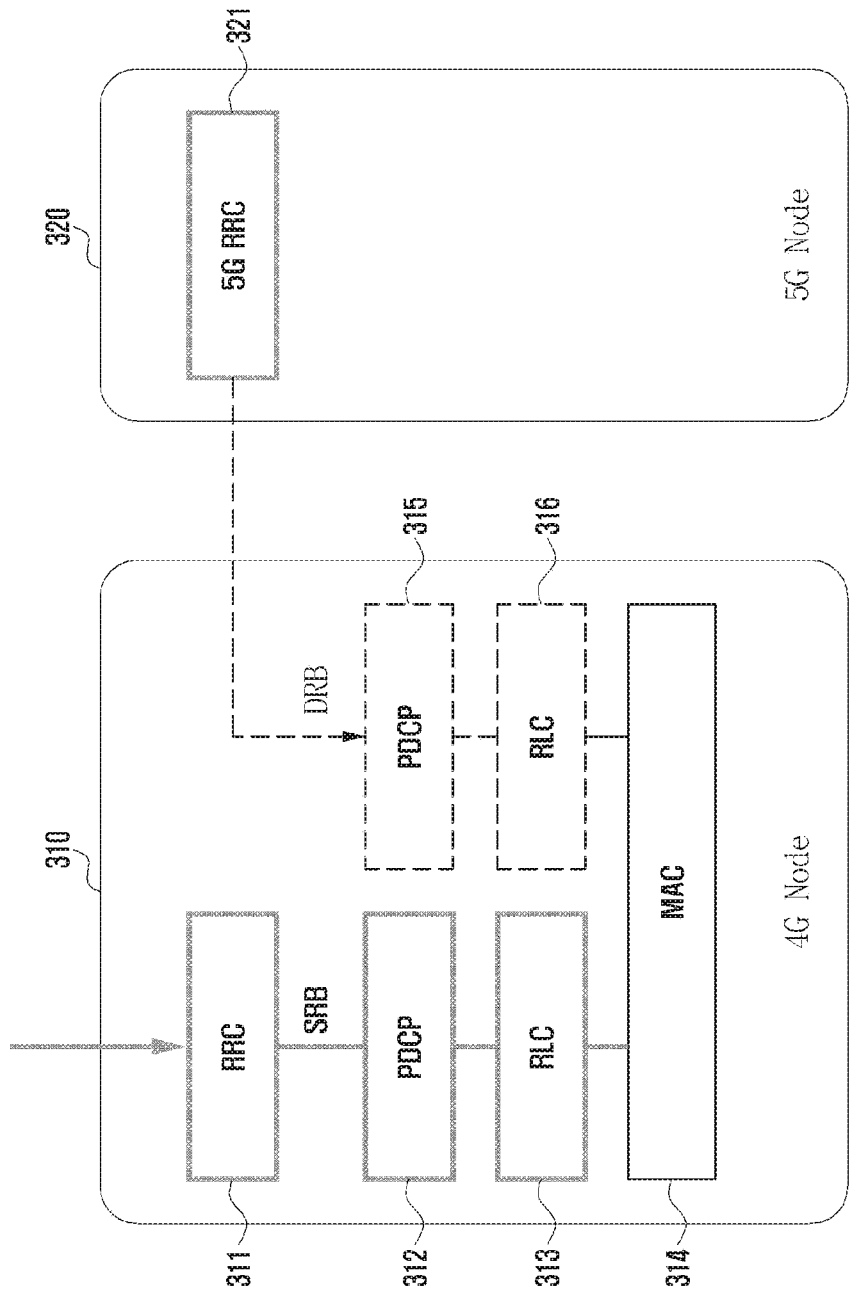
FIGS. 3A to 3C are diagrams illustrating a protocol stack of a control plane in a cellular network to which the disclosure is applied.
Figure 3B:
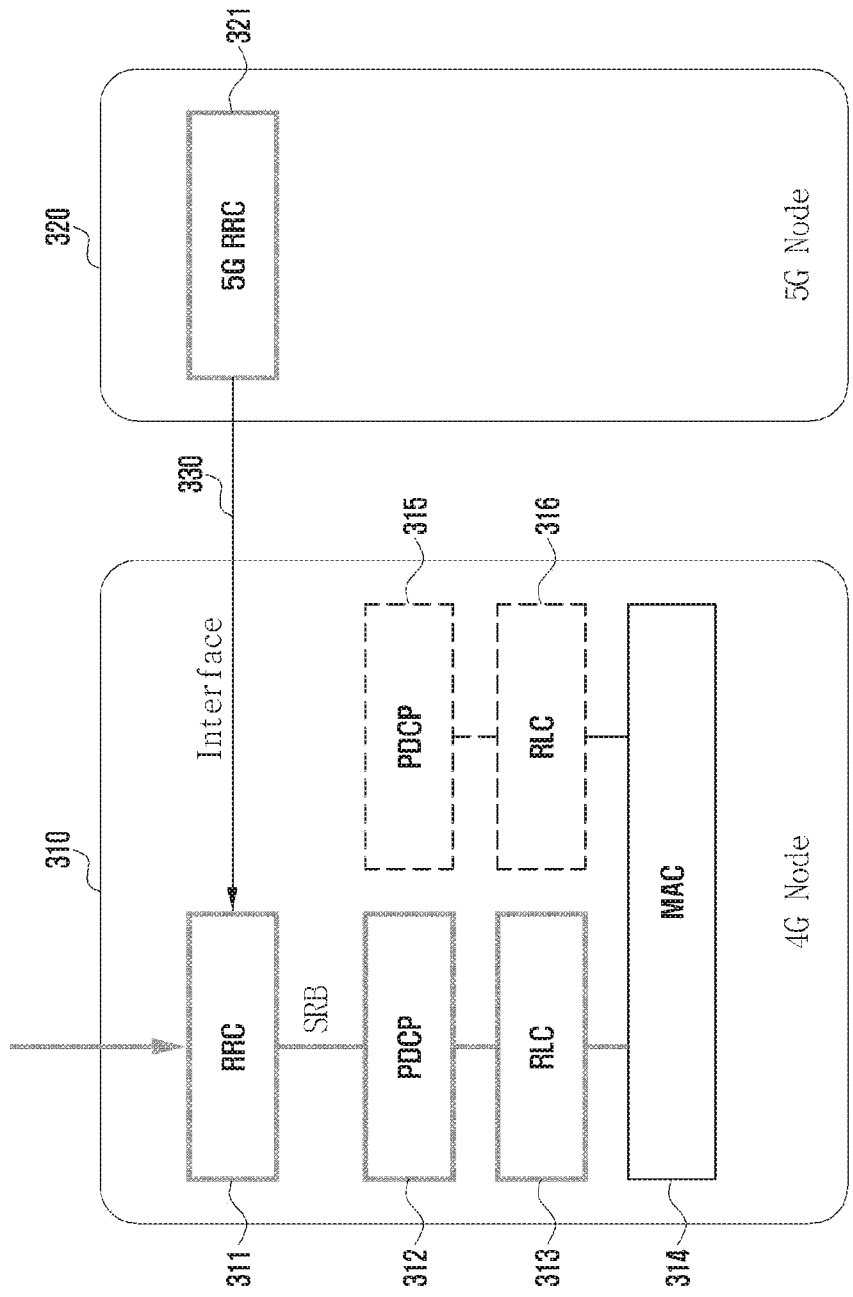
Figure 3C:
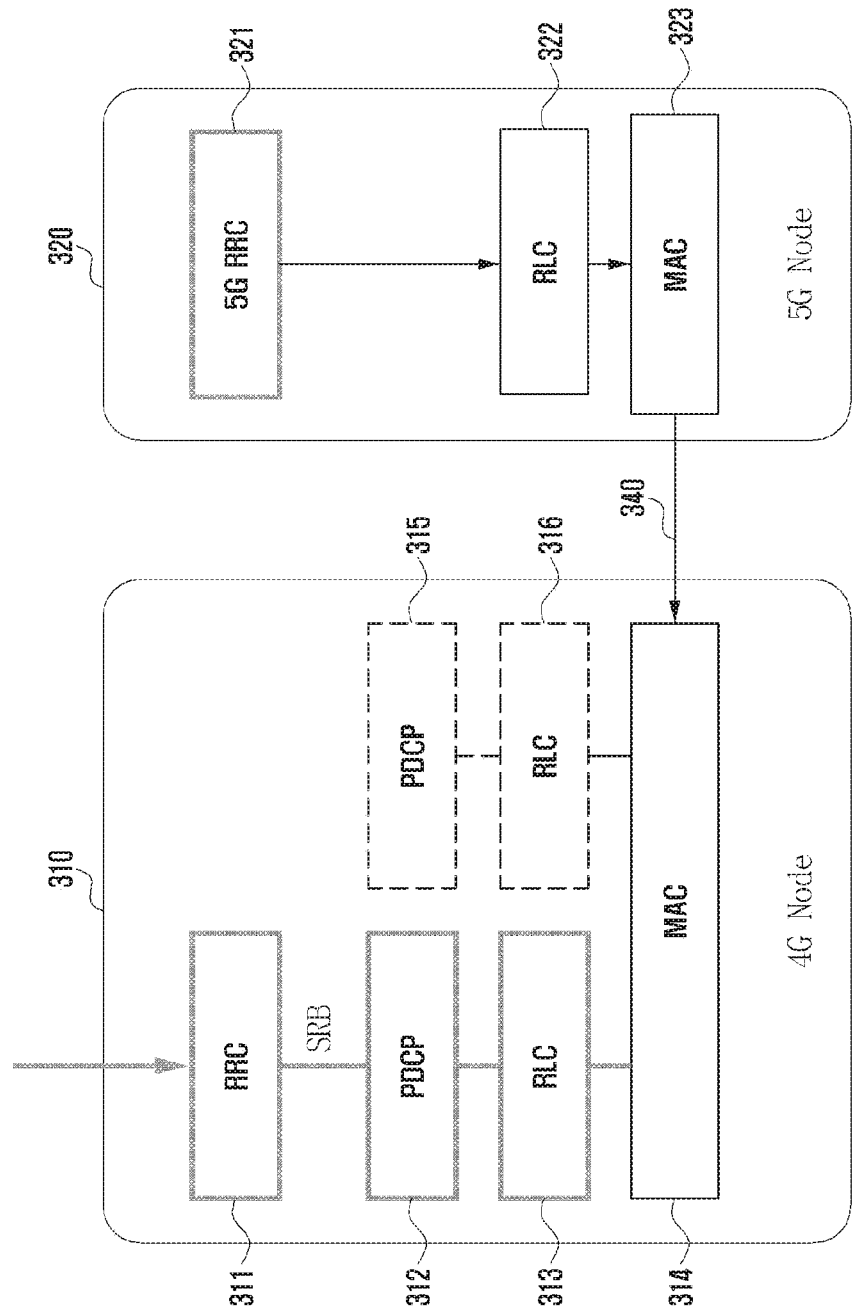

FIGS. 3A to 3C are diagrams illustrating a protocol stack of a control plane in a cellular network to which the disclosure is applied.

First, referring to FIG. 3A, the interworking on the control plane will be described. A 4G node 310 and a 5G node 320 can be distinguished on the side of the control plane. Each of the 4G node 310 and the 5G node 320 can be applied to the modem of the corresponding system. First, the 4G node 310 includes an RRC layer 311, a PDCP layer 312, an RLC layer 313, and a MAC layer for processing control signals of the 4G node. In addition, the 4G node may include the PDCP layer 315 and the RLC layer 316 for processing the control signals received from the 5G node at the 4G node. The MAC layer 314 may process both the signal from the 4G node and the signal from the 5G node. The protocol stack of the control plane may be configured in the same form as the other party communicating with the wireless communication device, for example, the base station.

The reason for configuring the control plane as shown in FIG. 3A is that the signal in the 5G network has the linearity as described above, and there is the high risk that the obstacle or the link of the mobile terminal is disconnected due to the properties that the refraction and diffraction are not good. Therefore, (중복) a method for transmitting time-insensitive control messages to a 5G control plane through a 4G data radio bearer (DRB) or a signaling radio bearer (SRB) in the dual connectivity structure of the 5G and 4G has been adopted.

FIG. 3A further illustrates the case where the packet data convergence protocol (PDCP) of the 4G node 310 is provided by receiving the DRB in the 5G RRC processor of the 5G node 320 communicating with the 5G network, and illustrates only the case where the SRB is received through the RRC signaling in the 4G network. It should be noted that FIG. 3A illustrates the control plane as one embodiment for illustrating various types to facilitate understanding, and the disclosure is not limited to FIG. 3A illustrated.

Under the dual connectivity structure of the 4G network and the 5G network as described above, the interworking is required for the 5G RRC control plane to operate according to the 4G RRC state or the radio (RF) state, and hardware and software architecture to satisfy latency requirement required in the 5G control plane should be provided.

In the case of the dual connectivity structure of the 4G network and the 5G network, the configuration complexity of the wireless communication device is increased, but it can only take advantage of the radio access technology (RAT) of the 4G network and the 5G network. For example, it can provide the high throughput which is the advantage of the 5G network and can achieve the wide coverage which is an advantage of the 4G, and the high reliability over 5G.

Next, FIG. 3B is a diagram illustrating the case where the signaling radio bearer (SRB) is used in the protocol stack of the control plane in the cellular network to which the disclosure is applied.

In contrast to FIG. 3A, FIG. 3B illustrates that the 4G node 310 and the 5G node 320 may be distinguished on the side of a control plane and all of the components may have the same form. Therefore, as described above, the 4G node 310 may include an RRC layer 311, a PDCP layer 312, an RLC layer 313, and a MAC layer for processing control signals of the 4G node. In addition, the 4G node may include the PDCP layer 315 and the RLC layer 316 for processing the control signals received from the 5G node 320 at the 4G node. The MAC layer 314 may process both the signal from the 4G node and the signal from the 5G node.

In contrast to FIG. 3A, in FIG. 3B, as in reference numeral 330, the 5G RRC message is not transferred to the PDCP DRB of the 4G node 310 but is transferred to the RRC 311 of the 4G node 310, and the 5G RRC message can be transmitted through the 4G RRC uplink information transfer (UL information transfer, when the 5G RRC is transmitted) and the downlink information transfer (DL information transfer, when the 5G RRC is received) message via the 4G SRB. Accordingly, the 5G RRC message can be processed as if it were a message generated at the NAS layer, which is an upper layer of the 4G RRC. By this configuration, the 5G RRC may be transferred through the 4G SRB without the 4G RRC being modified.

FIG. 3C is a diagram illustrating a case where an inter-MAC layer control message is transmitted in the protocol stack of the control plane in the cellular network to which the disclosure is applied.

The configuration of the 4G node 310 may have the same form as that of FIG. 3A or 3B described above. In addition, although the 5G node 320 is not illustrated in FIGS. 3A and 3B, the 5G node 320 may further include an RLC layer 322 and a MAC layer 323 therein. In the case of the configuration, the 5G control message received from the RRC layer 321 of the 5G node 320 is transferred to the RRC layer 322 and the MAC layer 323 of the 5G node 320, and the MAC layer 323 of the 5G node 320 may be transferred to the MAC layer 314 of the 4G node 310. In this case, the MAC layer 314 of the 4G node 310 may selectively apply the RRC message received from the 4G network and the RRC message received from the 5G network using the received path, history, the network information or preset identifier information.

On the other hand, in the case of a user plane under the dual connectivity structure of the 4G network and the 5G network, additional interworking functions such as splitting/switching/aggregation of the user data may be required unlike a control plane.

As described above, in order to have the dual connectivity structure of the 4G network and the 5G network, it should have a form capable of transmitting and receiving data between the 4G modem and the 5G modem. Hereinafter, a configuration for transmitting and receiving data between the 4G modem and the 5G modem to support the dual connectivity structure of the 4G network and the 5G network will be described.

FIGS. 4A to 4F are connection configuration diagrams for transmitting/receiving data between a 4G modem and a 5G modem in various manners according to the disclosure.

In the configurations of FIGS. 4A to 4F, the 5G modem uses reference numerals shown in FIG. 2A or 2B described above. However, it is apparent to those skilled in the art that the disclosure can be equally applied to the case of having the configuration of reference numeral 221 illustrated in FIG. 2C. In the following description, for convenience of description, the reference numeral 220 of the 5G modem will be described. Therefore, it may be equally applied to the case where the 5G modem has the configuration of FIG. 2C as well as the configuration of FIG. 2A or 2B. In addition, the configuration of FIGS. 4A to 4F is a connection configuration for transmitting/receiving data for the interworking between the 4G modem 120 and the 5G modem 220. Therefore, it should be noted that connection configuration between the respective modems 120 and 220 for transmitting user data between the application processors 101 are omitted in FIGS. 4A to 4F. In addition, the configuration of FIGS. 4A to 4F will be described on the assumption that the wireless communication device is mounted on a smart phone. However, it may be similarly or equally applied to customer premises equipment other than the smart phone. The application processor 101 may be collectively referred to as a controller, or may be implemented with the 4G modem in a single form. In the disclosure, it is assumed that the application processor 101 and the modems are configured in independent forms, respectively.

Figure 4A:
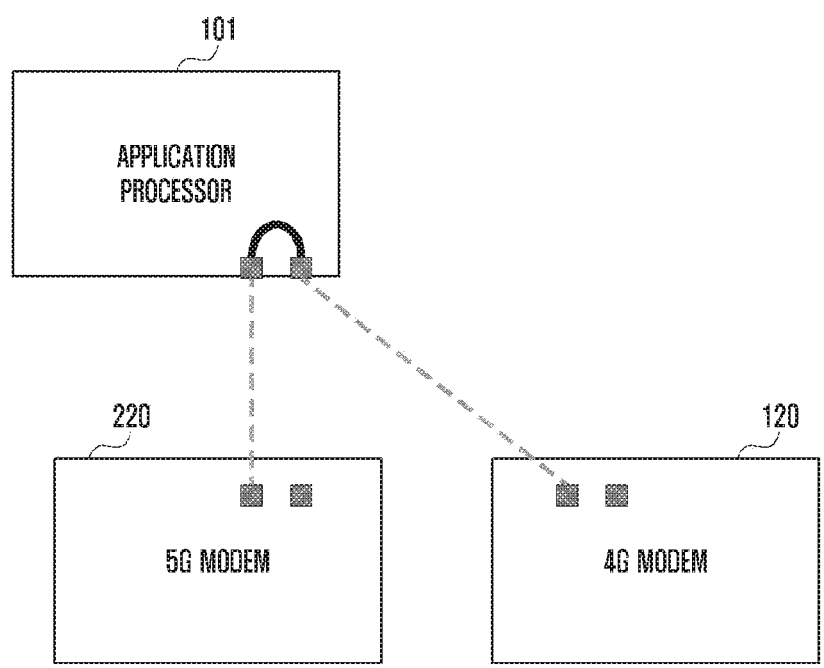
FIGS. 4A to 4F are connection configuration diagrams for transmitting/receiving data between a 4G modem and a 5G modem in various manners according to the disclosure.

Referring to FIG. 4A, an application processor mounted on an actual electronic device or a wireless communication device may have a general-purpose port therein. Therefore, as illustrated in FIG. 4A, the general-purpose port included in the application processor 101 may be configured as a bypass form, and may be used in a form in which the 5G modem 220 and the 4G modem 120 are connected to each other.

In the disclosure, when the 4G/5G modem is mounted on a wireless communication device in the two-chip form, the interworking between the 4G/5G modems may be provided under the dual connectivity structure, a low-speed direct interface may be connected between the 4G/5G modems, and the high-speed interface may be provided between the application processors 101 and the 4G modem 120 and between the application processor 101 and the 5G modem 220 for the user interface. Therefore, as illustrated in FIG. 4A, the general-purpose port included in the application processor 101 may be configured as the bypass form, and the low-speed interface may be provided between the 4G/5G modems in the form in which the 5G modem 220 and the 4G modem 120 are connected to each other. In addition, in FIG. 4A, the configuration for providing, by each of the 5G modem 220 and the 4G modem 120 described above, the high-speed interface with the application processor 101 is omitted, and the configuration in which the application processor 101 is connected to other devices is not shown for convenience of description.

Figure 4B:
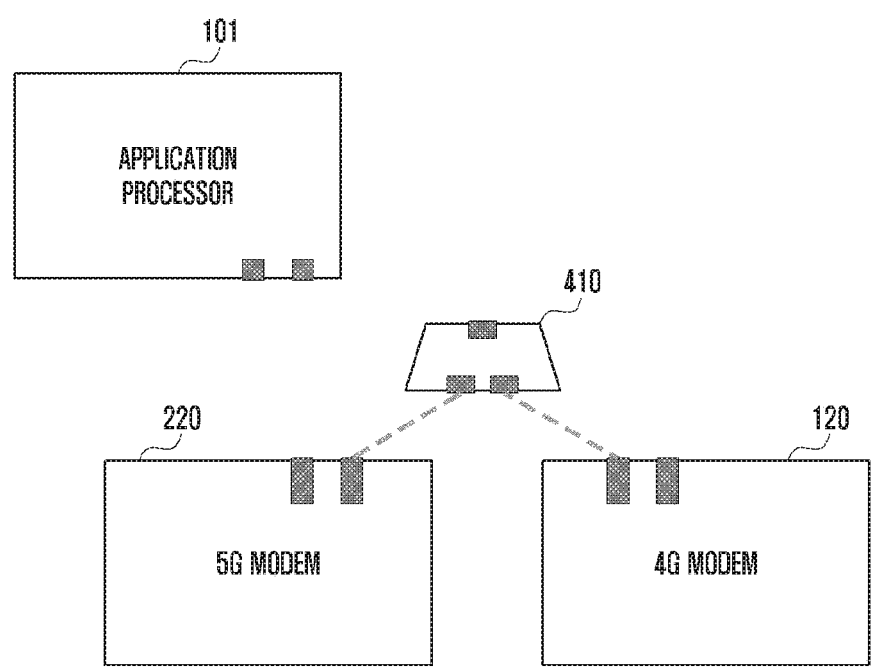

FIG. 4B is another embodiment according to the disclosure, in which a separate switch 410 independent of the application processor 101 can be used. As shown in FIG. 4B, the application processor 101 does not have the connection configuration for communication between the 5G modem 220 and the 4G modem 120. Here, the fact that the application processor 101 does not have the connection configuration with the 5G modem 220 and the 4G modem 120 means that it does not have the connection configuration for transmitting/receiving data or signals for the interworking between the modems. That is, as described above, the application processor 101 may have the high-speed interface with the 5G modem 220 and the 4G modem 120, respectively, or at least with the 4G modem 120 for transmitting/receiving the user data.

In the case of FIGS. 4A and 4B, when the application processor 101 has the general-purpose port configured in the bypass form, the delay of the data may be 100 ms or more. Therefore, since a considerable delay time occurs in FIG. 4A, the method for compensating for delay may be separately required. Therefore, in the case of FIG. 4A, it may be a method which may be adopted in the case of the processor capable of satisfying the minimum time for the interworking even when the general-purpose port included in the application processor 101 is configured in the bypass form.

On the other hand, the case of FIG. 4B may be the case where it is configured to transmit data necessary for interworking between the 4G modem 120 and the 5G modem 220 through a separate switch, for example, a direct general-purpose asynchronous receiver/transmitter (UART) interface. Therefore, since the separate switch 410 is used without passing through the application processor 101, and a switch may be adopted according to a desired speed, the case of FIG. 4B does not require the method for compensating for delay.

FIGS. 4C to 4F are connection configuration diagrams for interworking between the 4G modem and the 5G modem considering a connection with a sensor hub included in a general wireless communication device.

Generally, the wireless communication device may include various sensors. For example, various types of sensors such as a geomagnetic sensor, a touch sensor, a fingerprint sensor, and an illuminance sensor may be included.

Figure 4C:
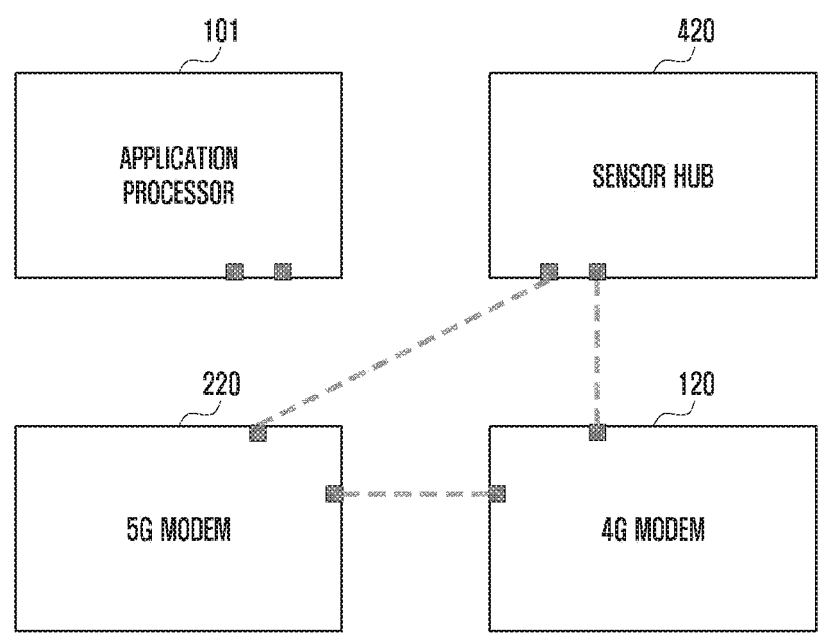

The sensor hub 420 of FIG. 4C may receive and collect signals detected from various sensors described above. In addition, the sensor hub 420 may also provide the received and collected signals to the 4G modem 120 and the 5G modem 220, respectively. This is because there may be cases in which communication is performed by waking up the 4G modem 120, the 5G modem 220 or both of them among the signals received from the sensor hub 420 in a specific case. Thus, the 4G modem 120 or the 5G modem 220 may be configured to receive data from the sensor hub 420, respectively, as illustrated in FIG. 4C. In addition, according to the disclosure, a direct connection may be made for interworking between the 4G modem 120 and the 5G modem 220.

Figure 4D:
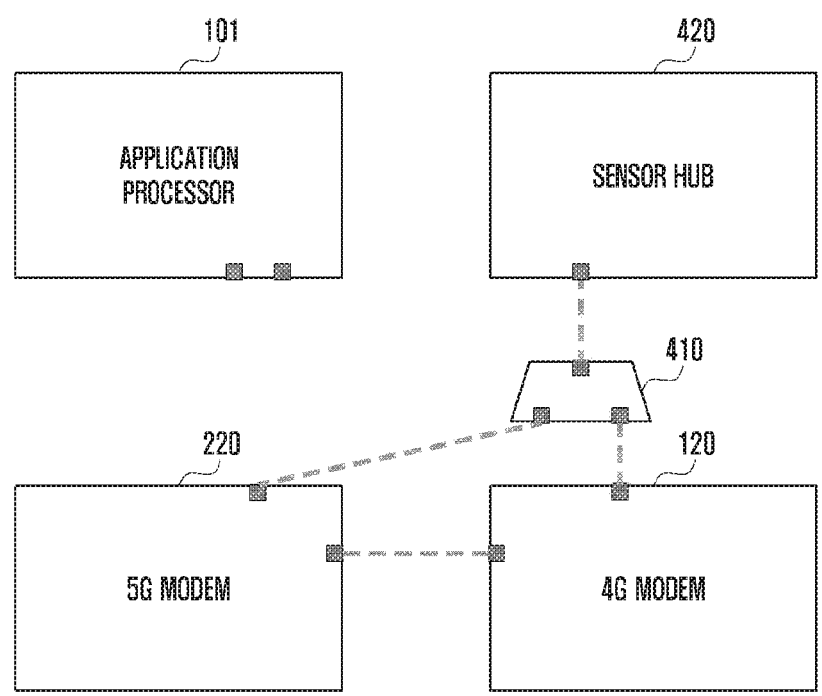

FIG. 4D illustrates that the switch 410 is further provided, as compared to FIG. 4C. In the case of FIG. 4D, the same information may be transmitted from the sensor hub 420 to the 4G modem 120 and the 5G modem 220, respectively. Accordingly, the same data can be distributed through the switch 410. In this case, the number of ports to be connected to the sensor hub 420 may be insufficient. For example, when only the port for connecting with the existing 4G modem 120 is provided, the sensor hub 420 may not have a port for connection with the 5G modem 220. In this case, a switch configuration for simultaneously transmitting data to the 5G modem 220 and the 4G modem 120 or data only to at least one modem if necessary may be further provided.

Figure 4E:
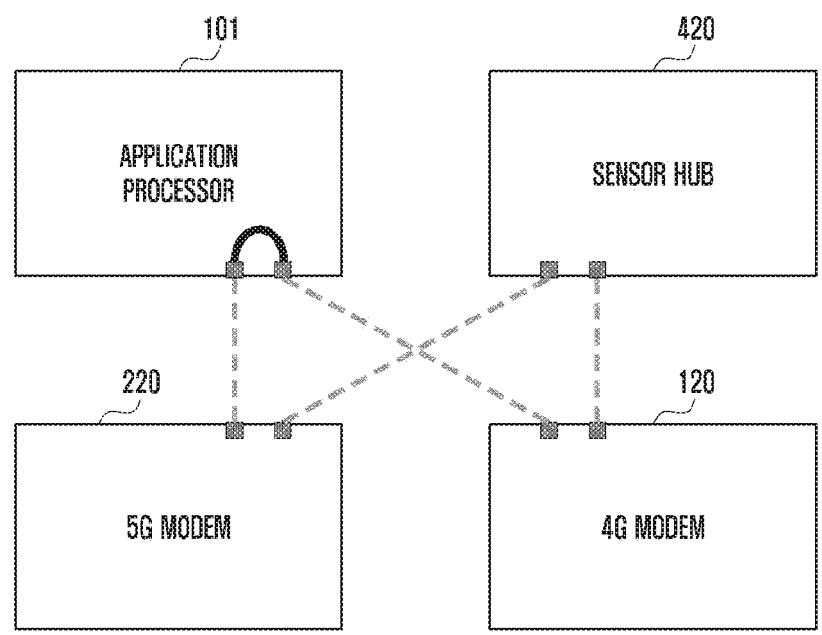

FIG. 4E illustrates a connection configuration diagram for interworking with the 5G modem 220 when there is no additional port in the existing 4G modem 120.

The configuration of FIG. 4E can be a combination of the configuration of FIG. 4A and the configuration of FIG. 4C described above. That is, the general-purpose port included in the application processor 101 is configured in the bypass form for connecting between the 5G modem 220 and the 4G modem 120, and provides the low-speed interface between the 4G/5G modems. In addition, the sensor hub 420 is configured to receive and collects signals detected from the above-described various sensors, and separately provide the received and collected signals to the 4G modem 120 and the 5G modem 220, respectively.

The configuration of FIG. 4E can be adopted when the general-purpose port included in the application processor 101 as described above is the processor in which the transmission delay in the bypass form can satisfy the minimum time for the interworking. Therefore, the 4G modem 120 and the 5G modem 220 can provide the low-speed interface between the modems by connecting the general-purpose port included in the application processor 101 in the bypass form. Also, when the sensor hub 420 is connected to the 4G modem 120 and the 5G modem 220, respectively, the sensor hub 420 may have the sufficient number of ports.

Figure 4F:
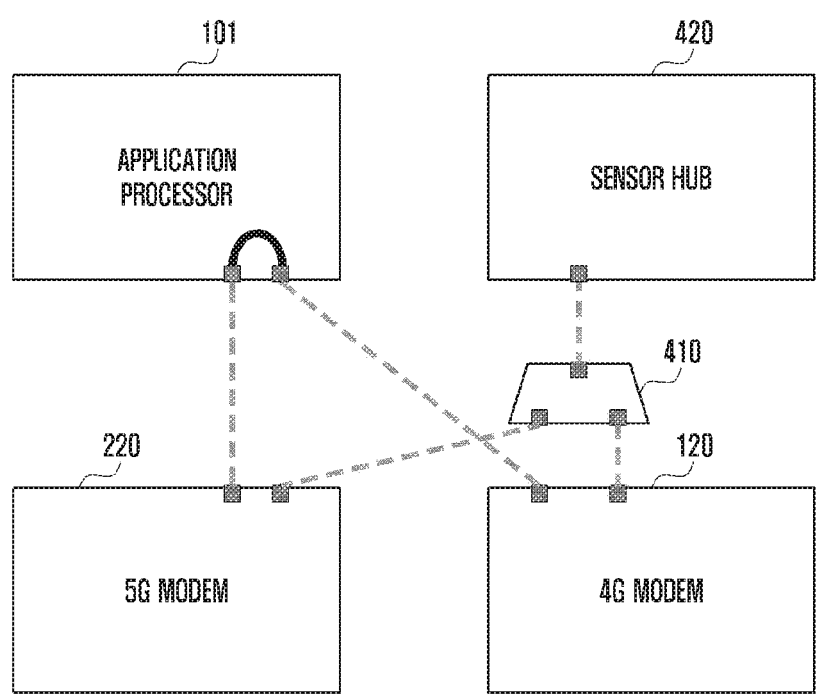

The configuration of FIG. 4F may be a case where the port of the sensor hub 420 is insufficient as compared with the case of FIG. 4E. Therefore, as in the case of FIG. 4D, the same data and information may be transmitted from the sensor hub 420 to the 4G modem 120 and the 5G modem 220, respectively, through the switch 410.

The configurations of FIGS. 4A to 4F as described above may be the embodiments in the case where the 5G modem 220 and the antenna are added to operate in a state in which the change of the modules of the existing 4G system is minimized.

Figure 5A:
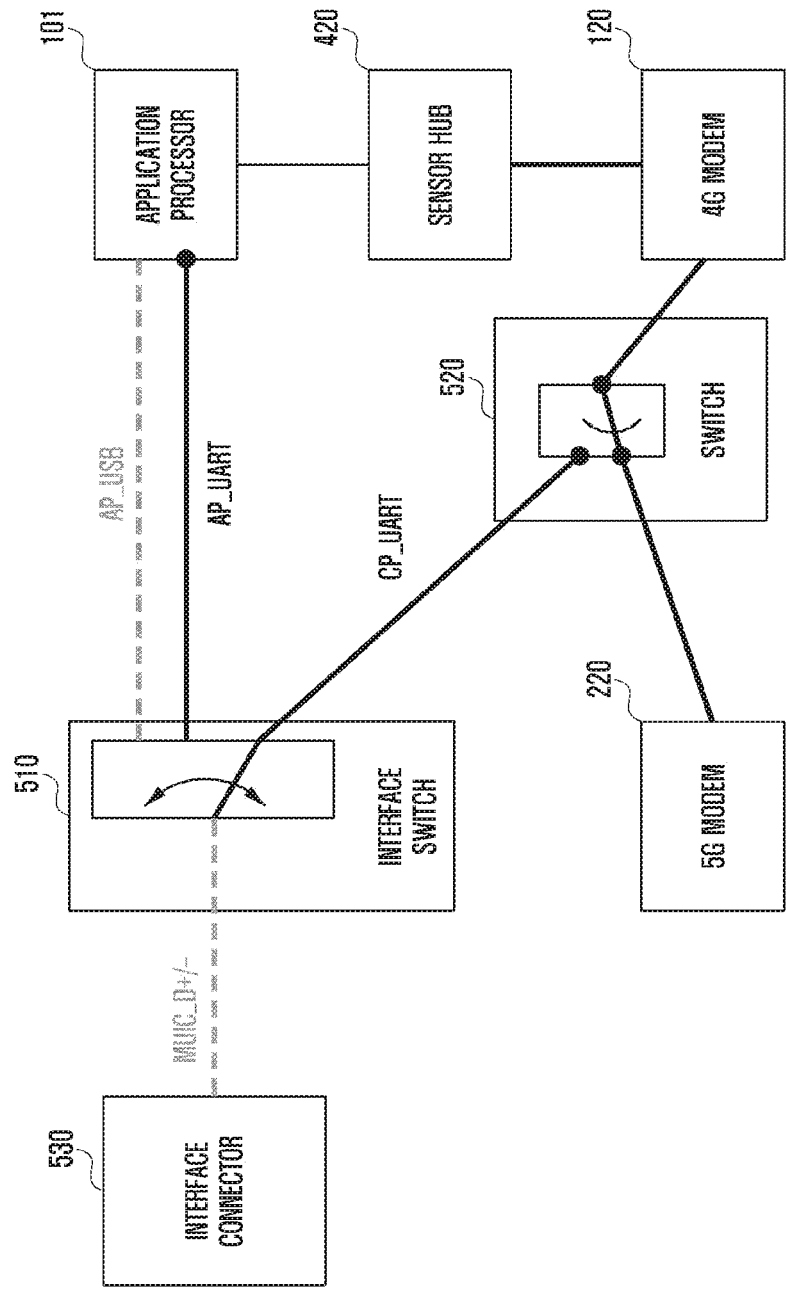
FIGS. 5A and 5B are connection configuration diagrams of modules mounted in the wireless communication device according to an embodiment of the disclosure.
Figure 5B:
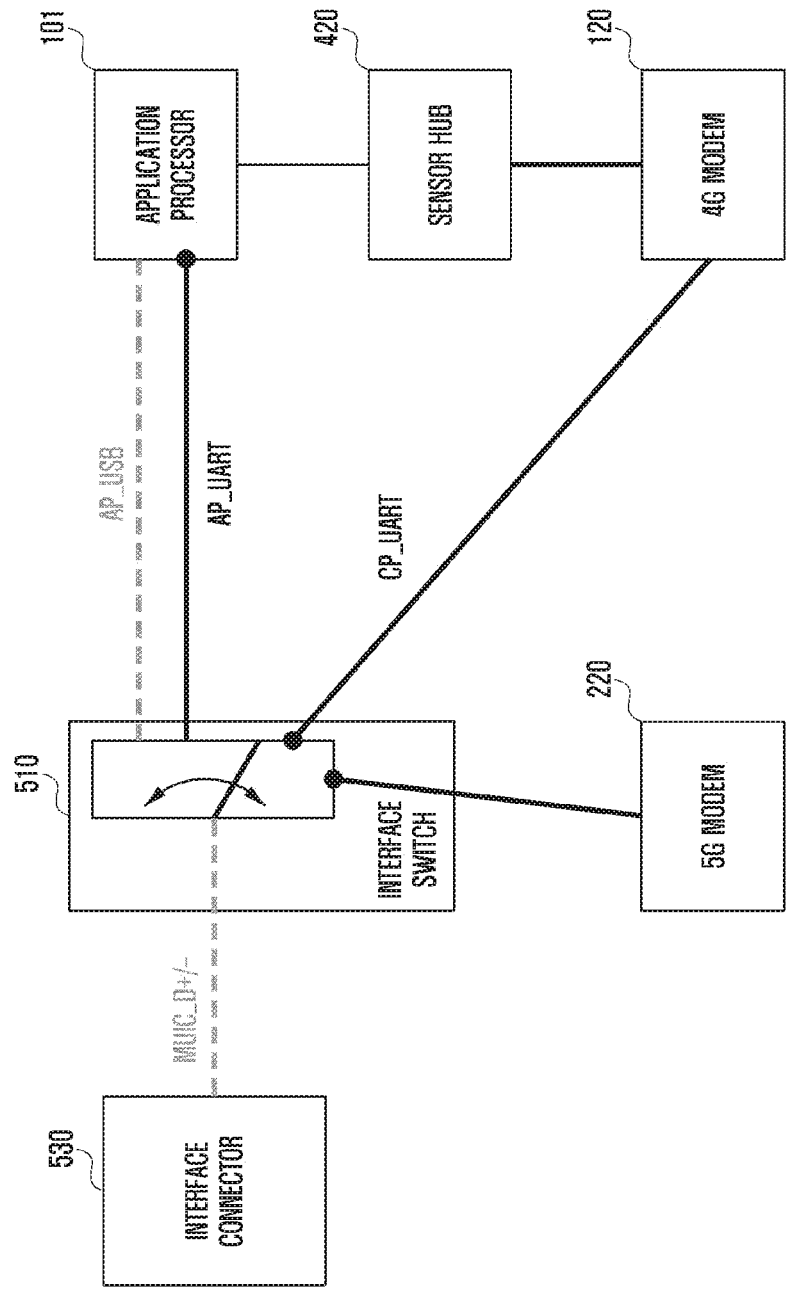

FIGS. 5A and 5B are connection configuration diagrams of modules mounted in the wireless communication device according to an embodiment of the disclosure.

Referring first to FIG. 5A, the application processor 101, the sensor hub 420, the 4G modem 120, the 5G modem 220, the switch 520, an interface switch 510, and an interface connector 530 may be included. This type of configuration assumes that the wireless communication device is the smart phone. The interface connector 530 may be a connector for transferring data, signals and the like from the external device or other devices included in the smart phone to the application processor 101. In addition, the interface switch 510 may be a switch included in a power management module. In addition, according to the disclosure, a switch capable of connecting between the interface switch 510 and the 5G modem 220 and the 4G modem 120 may be further provided. Accordingly, the switch 520 may connect between the 5G modem 220 and the 4G modem 120 or connect between the 5G modem 220 and the interface switch 510.

The interface switch 510 may be switched to be connected between the interface connector 530 and the application processor 101 and the switch 520. That is, the interface switch 510 may be switched to be connected to the UART port or the USB port of the application processor 101 and the interface connector 530, or may be switched so as to connect between the switch 520 and the application processor 101.

In addition, in the disclosure of 5A, only the connection between the sensor hub 420 and the 4G modem 120 and the connection between the sensor hub 420 and the application processor 101 are illustrated. However, the sensor hub 420 may further include the connection configuration with the 5G modem 220 as shown in FIGS. 4C to 4F described above.

Through the above configuration, messages, signals, data, information and the like to be transmitted may be transmitted/received through the UART port of the 4G modem 120 and the UART port switch 520 of the 5G modem 220. For example, the 5G communication control data can be transmitted/received from and to the 4G modem. In addition, the UART port of the 4G modem 120 or the 5G modem 220 may be connected to the connector interface through the switch 520 and interface switch 510 to transmit/receive messages, signals, data, information and the like to be transmitted to an external device. For example, it is possible to receive a signal for controlling the terminal during the terminal manufacturing process from an external device or transmit a response to the received signal to the external device.

FIG. 5B illustrates the form in which the 5G modem 220 and the 4G modem 120 are directly connected to the interface switch 510 without the switch 520 as compared with FIG. 5A. Therefore, the interface switch 510 may be switched to connect between the 5G modem 220 and the application processor 101. In addition, the interface switch 510 may be switched to connect between the 4G modem 120 and the application processor 101. In addition, the interface switch 510 may be switched to connect between the interface connector 530 and the application processor 101. The interface switch 510 may provide a path for transmitting/receiving messages, signals, data, information, and the like to be transmitted to each other through the switching.

In addition, in the disclosure of FIG. 5B, only the connection between the sensor hub 420 and the 4G modem 120 and the connection between the sensor hub 420 and the application processor 101 are illustrated. However, the sensor hub 420 may further include the connection configuration with the 5G modem 220 as shown in FIGS. 4C to 4F described above.

The switches in FIGS. 4A to 4F described above or the switch 520 and interface switch 510 described in FIGS. 5A and 5B may be collectively referred to as data communication interfaces. Hereinafter, in the case where each drawing is exemplified, the contents added to the drawings will be described. However, this is merely for convenience of description, and can be collectively referred to as a data communication interface for transmitting data between each modems, between the modem and the application interface or between the modem and the sensor hub FIGS. 6A and 6B are hierarchical structure diagrams for processing signals of the 4G modem and the 5G modem according to the embodiment of the disclosure.

Figure 6A:
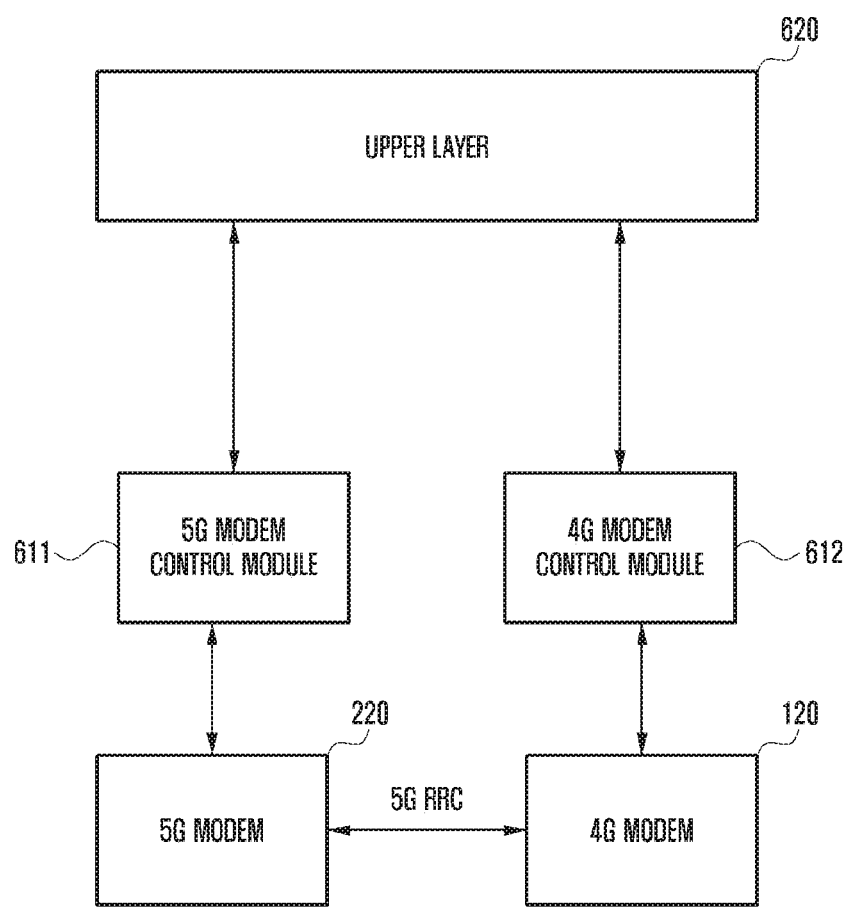
FIGS. 6A and 6B are hierarchical structure diagrams for processing signals of the 4G modem and the 5G modem according to the embodiment of the disclosure.
Figure 6B:
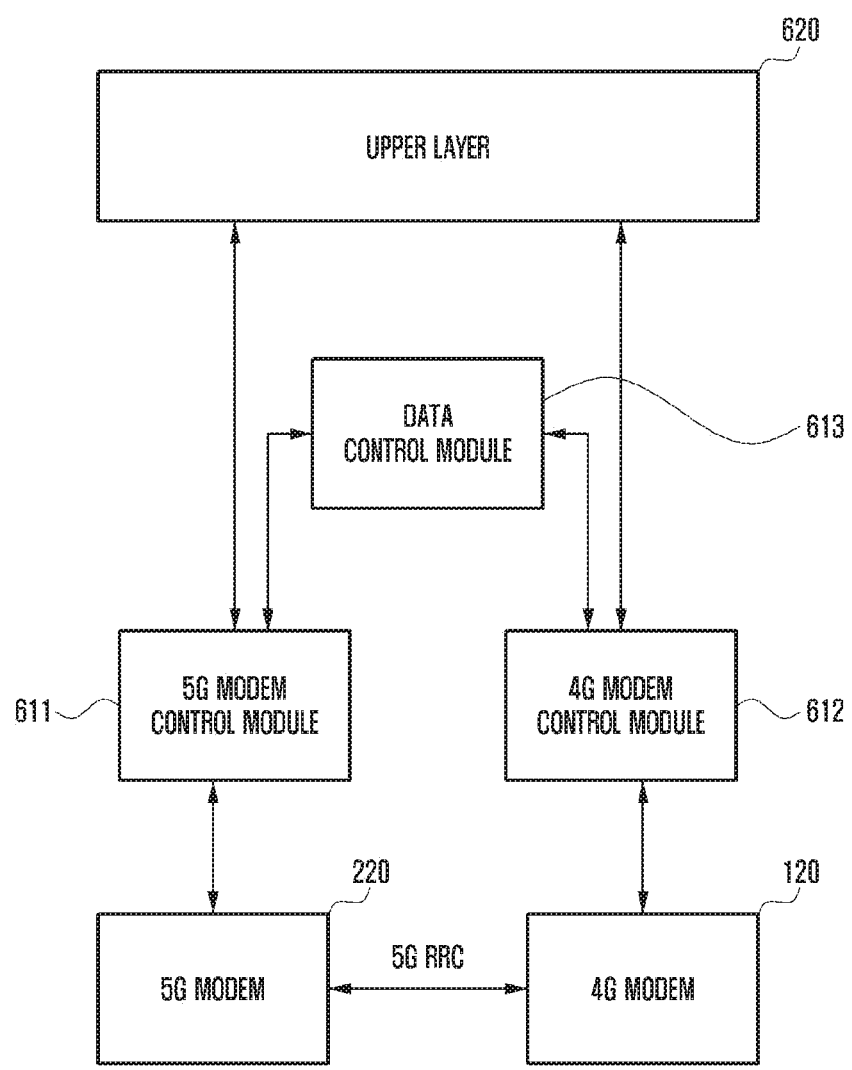

Referring first to FIG. 6A, the 5G modem 220, the 4G modem 120, and an upper layer 620 may be included. The 4G modem 120 may include the protocol stack of the layer described in FIGS. 3A to 3C. The 5G modem 220 may also include a protocol stack of the same or similar type as or to a 4G modem. However, the 5G modem 220 among the protocol stacks of the 4G modem of FIGS. 3A to 3C does not have a configuration for receiving and processing the control message from the 4G modem.

As described above, the DRB/SRB of the 4G may be used for the reliable 5G control plane. In addition, data of the actual user plane are transmitted to a 5G modem control module 611 in the case of the user data processed in the 5G modem 220. Accordingly, the data processed by the 5G modem 220 is transmitted from the 5G-PDCP DRB (not shown) among the protocol stacks in the 5G modem 220 to the 5G modem control module 611.

In the configuration of FIG. 5 according to the disclosure, the process for authentication of the wireless communication device is performed only once using the 4G modem 120, and the 5G modem 220 can be reused using the information authenticated by the 4G modem 120.

In addition, the UART interface may connect between the 4G modem 120 and the 5G modem 220. A 5G RRC message may be exchanged when the UART interface connects between the 4G modem 120 and the 5G modem 220. That is, the 5G RRC may be distinguished from the LTE-PDCP DRB/LTE-PDCP SRB among the protocol stacks of the 4G modem 120 and transmitted to the 5G modem 220 through the UART interface. Conversely, the 5G RRC may be transmitted from the RRC of the 5G modem 220 to the LTE-PDCP DRB/LTE-PDCP SRB of the 4G modem 120 through the UART interface. In addition, 4G RRC State information needs to be transmitted to the 5G modem 220 in the 4G modem 120. This is because it is necessary to check whether the 4G RRC state is a connected state or an idle state capable of processing a 5G RRC message since the 5G RRC message is transmitted through the 4G DRB/SRB. In addition, 5G/4G DRX Info can be transmitted using the UART interface between the 4G modem 120 and the 5G modem 220, and 5G/4G cell search and measurement information may be transmitted. In addition, the 5G AS Security & Integrity Key may be transmitted using the UART interface between the 4G modem 120 and the 5G modem 220. For example, the 4G modem 120 may transmit the Security & Integrity Key to the 5G modem 220 through the UART interface whenever the 4G LTE KeNB value is set or changed. Therefore, the 5G modem 220 can generate 5G Security & Integrity Key using the value received from the 4G modem 120. In another embodiment, the UART interface may be replaced by an interface that connects between other modems. Examples of the replaceable interface may include asynchronous serial interfaces, synchronous serial interfaces, I2C, SPI, USB, peripheral component interconnect express (PCIe), or Inter-chip wireless communication that a person having ordinary skill in the art can be conceivable.

The reason why data is shared between the 4G modem 120 and the 5G modem 220 will be more clearly understood from the following drawings.

Also, the 5G modem control module 611 may be constituted by one module and a plurality of modules, or may be constituted by a protocol stack format when it is constituted by the plurality of modules. When the 5G modem control module 611 is configured in the form of the protocol stack, for example, it may include an IPC input/output device module for communication with the upper layer 620, a control module for controlling the 5G modem 220, a module for managing the 5G link, and the like.

Also, the 4G modem control module 612 may be constituted by one module and a plurality of modules, or may be constituted by a protocol stack format when it is constituted by the plurality of modules. When the 4G modem control module 612 is configured in the form of the protocol stack, for example, it may include an IPC input/output device module for communication with the upper layer 620, a control module for controlling the 4G modem 120, a module for managing the 4G link, and the like.

The upper layer 620 is collectively referred to as all the layers located in the upper part of the communication device, and combines data received from the 4G modem 120 and/or data received from the 5G modem 220, and may split and divide data to be transmitted into the 4G modem 120 or the 5G modem 220 and output the data.

Referring to FIG. 6B in comparison with FIG. 6A, there is no connection between the 4G modem 120 and the 5G modem 220. A data control module 613 is instead provided. The data control module 613 may split the data to be transmitted to the 4G modem 120 and/or the 5G modem 220, which is performed by the upper layer 620, provide the data to the corresponding 5G modem control module 611 and/or the 4G modem control module 612, and combine data received from the 5G modem control module 611 and/or the 4G modem control module 612 and provide the combined data to the upper layer 620.

Also, the structure of FIG. 6B can be switched transparently at a TCP/IP or application stage. That is, the 4G modem 120 and the 5G modem 220 share an IP address. Therefore, not only IP layer but also application may provide a transparent configuration.

The data control module 613 located in the kernel 610 is free from loss when the data are switched or split in two different modems of the 4G modem 120 and the 5G modem 220, and may support In-Sequence Switching.

Based on the above description, the wireless communication device having the dual connectivity structure of the 4G and the 5G networks and the cases in which the interworking is required in a network for supporting the same will be described with reference to the accompanying drawings.

Figure 7:
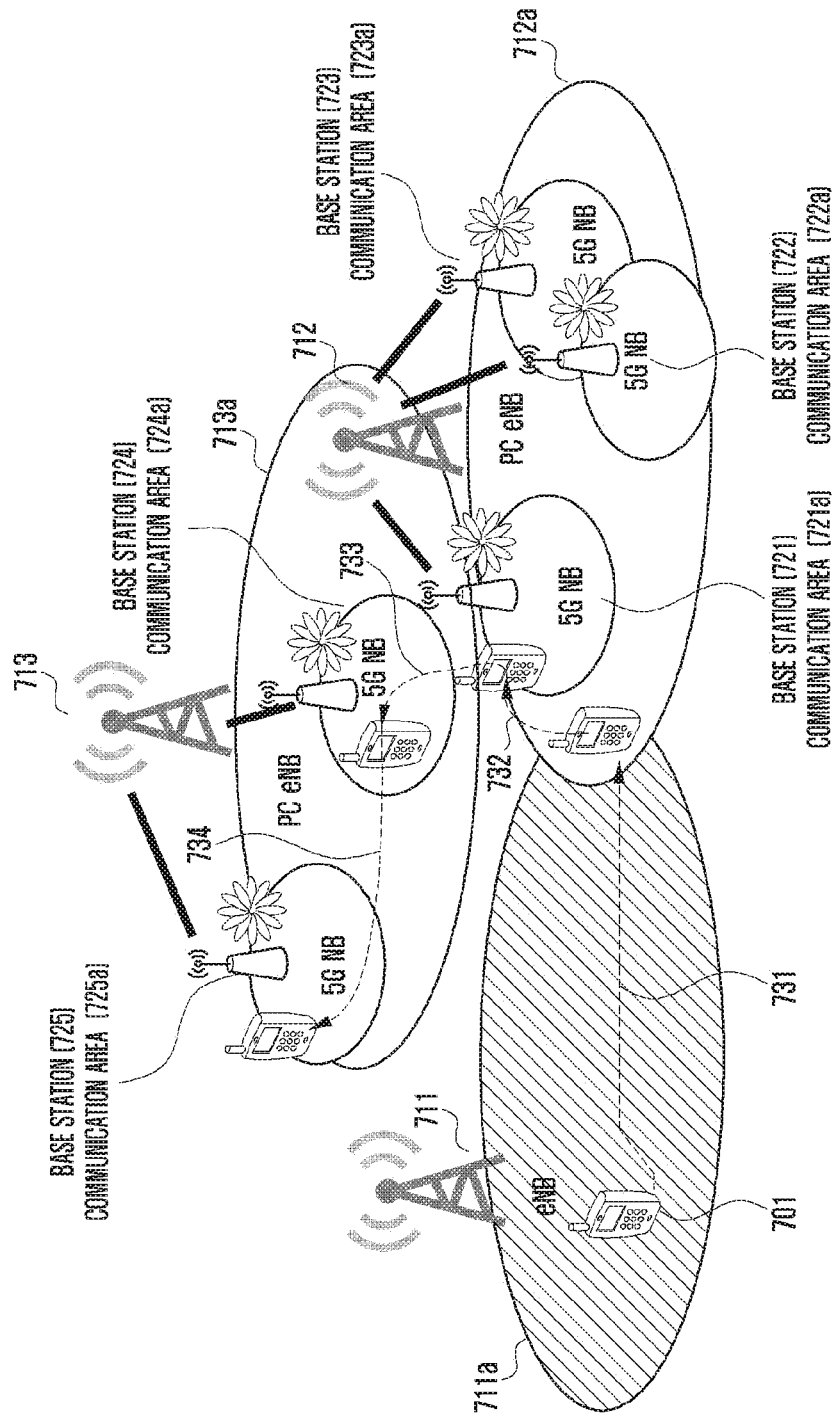
FIG. 7 is a network conceptual diagram illustrating a case where a wireless communication device according to the embodiment of the disclosure moves to areas of the 4G network and the 5G network.

FIG. 7 is a network conceptual diagram illustrating a case where a wireless communication device according to the embodiment of the disclosure moves to areas of the 4G network and the 5G network.

Referring to FIG. 7, each base station 711, 712, and 713 of the 4G network has communication areas 711a, 712a, and 713a. Also, the 5G base stations 721, 722, 723, 724, and 725 each have their own communication areas 721a, 722a, 723a, 724a, and 725a. The 4G base stations 711, 712, and 713 have areas of a wider base station than the 5G base stations 721, 722, 723, 724, and 725 because the radio signals are well refracted and diffracted. Accordingly, the communication areas 711a, 712a and 713a of the 4G base stations 711, 712 and 713 have a wider range than the communication areas 721a, 722a, 723a, 724a and 725a of the 5G base stations 721, 722, 723, 724 and 725.

In this case, as one embodiment, it is assumed that the wireless communication device 701 capable of communicating with both the 4G and 5G networks moves from the position of the first base station 711 to the position of reference numerals 731→732→733→734.

First, when a wireless communication device 701 is located in a communication area of the first base station 711, the wireless communication device 701 performs communication with the 4G network because only the 4G network is searched. At this time, when the wireless communication device 701 moves as indicated by reference numeral 731, it may be located in a handover area of the first base station 711 and the second base station 712. In this case, the wireless communication device 701 should be handed over from the first base station 711 to the second base station 712. Even at this time, since both the first base station 711 and the second base station 712 are base stations of the 4G network, the wireless communication device 701 can perform communication using only the 4G modem.

Thereafter, the wireless communication device 701 may move as indicated by reference numeral 732. In this case, the wireless communication device 701 may communicate with the second base station 712 or may communicate with the fourth base station 721 which is the base station of the 5G network. Therefore, the wireless communication device 701 should keep the 5G continuously turned on when the 5G modem is not aware of turning on and off the 5G modem at any point in time. If the 5G modem is continuously kept turned on, the wireless communication device 701 consumes unnecessary power when it is located within the area of the first base station 711 described above.

In order to prevent this, it is necessary to determine when the 5G modem should be turned on in the case where the wireless communication device 701 keeps the 5G modem turned off. Also, as shown by reference numeral 733, it is very important to determine the turn on/off point in time of the 5G modem when the wireless communication device moves from the area of the 5G base station to the area of the 4G base station and then to the area of the 5G base station again. That is, the first problem is that since the wireless communication device 701 includes the 4G modem and the 5G modem, respectively, it is necessary to define at what point in time the 5G modem is turned on and at what point in time the 5G modem is turned off.

Next, in the aspect of the base station, if the wireless communication device 701 moves as indicated by reference numeral 732, it should be determined whether to use the 4G network or the 5G network. If the 5G network is used, the 5G network should be selected using the 4G DRB/SRB to ensure reliability as described above.

Second, the point in time when the 4G DRB/SRB for the 5G RRC is generated, the transmission scheme from the 4G modem to the 5G modem, and the like should be determined.

Third, in the case of the 5G data and the 4G data, it is also necessary to determine the point in time when to switch the data path.

Fourth, when the 4G handover is generated, for example, in the case of moving as indicated by reference numeral 733, it is necessary to determine how to process the 5G DRB of the 5G.

Fifth, because the 4G link are used for reliability, it is necessary to determine how to process the 5G DRB if the 4G radio link failure (RLF) occurs.

Sixth, if a failure occurs when the RLF occurs in the 4G network or the channel is re-established, it is necessary to determine how to process the 5G DRB.

Seventh, when the time of the 4G inactivity timer expires, it is necessary to determine how to process the 5G DRB. This problem should be essentially resolved because the 5G communication is based on the 4G network.

In addition, the above-mentioned seven problems to be solved may be more necessary because the 4G modem and the 5G modem are implemented on a separate chip. Therefore, a method for solving the above-mentioned seven problems will be described below.

Figure 8A:
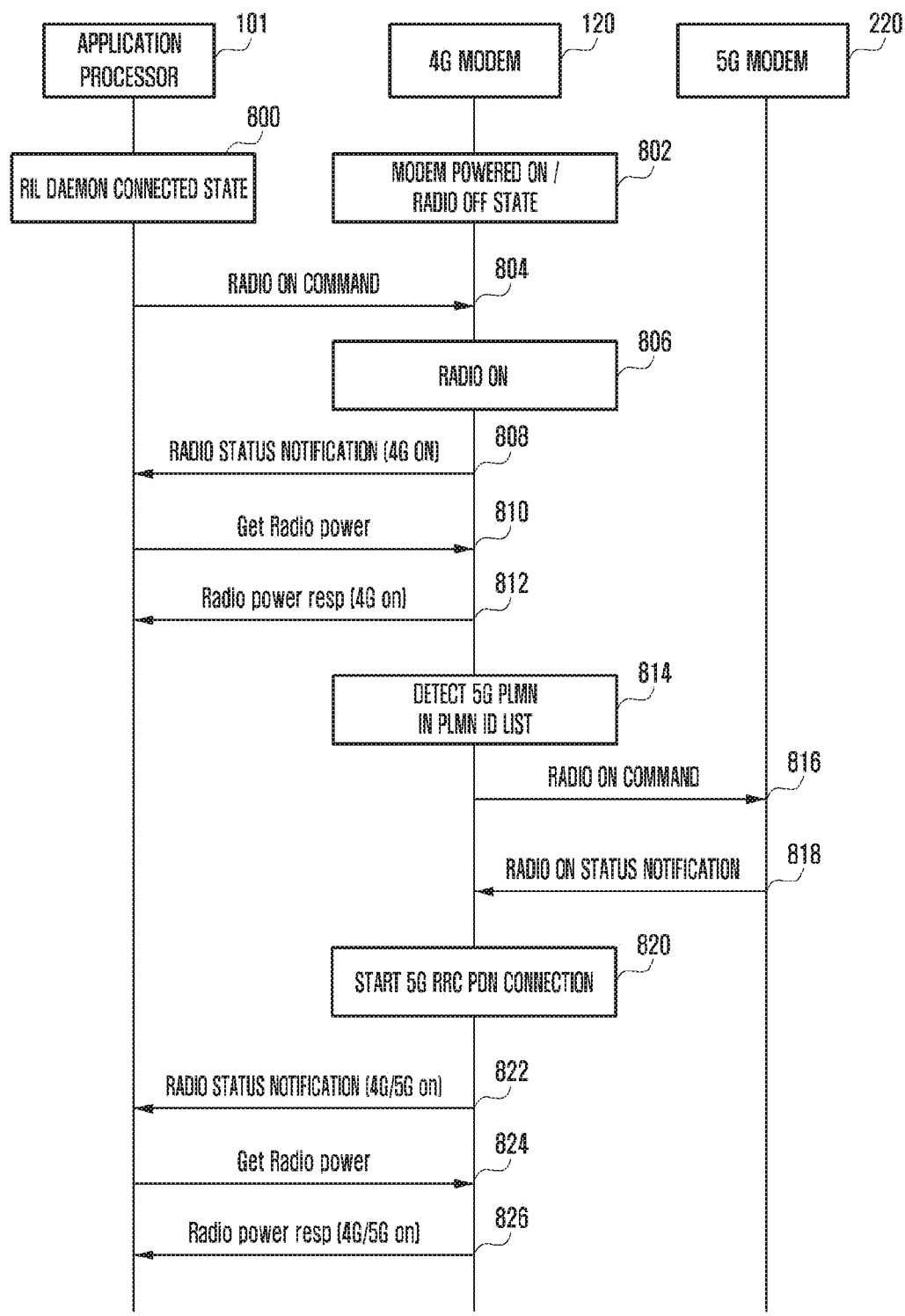
FIG. 8A is an internal control flowchart of the wireless communication device when the 5G modem is powered on in the wireless communication device according to the disclosure.

FIG. 8A is an internal control flowchart of the wireless communication device when the 5G modem is powered on in the wireless communication device according to the disclosure.

It is assumed that in operation 800, the application processor 101 is in a radio interface layer (RIL) daemon operation state and in operation 802, the 4G modem 120 is in the power on state but in the radio off state. It should be noted that the operation 800 and the operation 802 are not sequential operations over the time, but are only for explain the present state. For example, when the wireless communication device is initially powered on, or the radio of the cellular network is turned off due to a flight mode or a user's need or due to a network situation, or the like. Therefore, the application processor 101 may be aware that the radio of the 4G modem 120 has already been turned off.

The application processor 101 may transmit a radio on command to the 4G modem 120 in operation 804. The 4G modem 120 may then attempt to connect to the 4G network by turning on the modem's radio in operation 806. At this time or after accessing the 4G network, the 4G modem 120 may transmit a radio status notification message to the application processor 101 in operation 808. When the application processor 101 receives the radio status notification message in operation 808, it may transmit a get radio power command in operation 810.

The 4G modem 120 may acquire the radio power of the 4G network in response to the get radio power command, generate the acquired radio power as the response, and then transfer the generated radio power to the application processor 101 in operation 812.

Thereafter, the 4G modem 120 may receive the PLMN ID list from the base station connected from the 4G network. The 4G modem 120 may check whether the 5G PLMN list is included when receiving the PLMN ID list from the base station connected from the 4G network in operation 814. For example, the PLMN ID may include an MCC and an MNC, and a method for distinguishing between 4G and 5G by assigning an MNC portion differently from 4G may be used.

If the 5G PLMN is included in the PLMN ID list received from the base station connected from the 4G network, the 4G modem 120 transmits a 5G modem on command to the 5G modem 220 in operation 816. Accordingly, the 5G modem 220 can turn on the power supply and radio based on the radio on command and can connect to the 5G network. At this time, the 5G modem 220 may transmit a radio on status notification message to the 4G modem 120 in operation 818.

When the 4G modem 120 and the 5G modem 220 are installed together as described above, the disclosure is configured to operate in the 4G network in order to ensure the reliability of the 5G network. Accordingly, the 4G modem 120, which is communicating with the 4G network, may start a 5G RRC PDN connection in operation 820 upon receiving a radio on status notification message from the 5G modem 220 in operation 818.

In addition, since both the 4G modem and the 5G modem are turned on, the 4G modem 120 may generate and transmit the radio status notification message to the application processor 101 in operation 822. At this time, the 4G modem 120 can notify that the 4G modem and the 5G modem are both turned on in the status notification message transmitted to the application processor in operation 822.

When the application processor 101 receives the radio status notification message in operation 822, it may transmit a command requesting a get radio power to the 4G modem 120 in operation 824. Accordingly, the 4G modem 120 may generate a response message to radio power (Radio Power Response) in operation 826 and transmit the generated response message to the application processor 101. At this time, the response message to the radio power transmitted in operation 826 may notify that the 4G modem 120 and the 5G modem 220 are both turned on.

As described above, in FIG. 8A, it is possible to determine whether the wireless communication device enters the 5G network through the 4G network, and control the operation of turning on the 5G modem 220 according to the result.

Figure 8B:
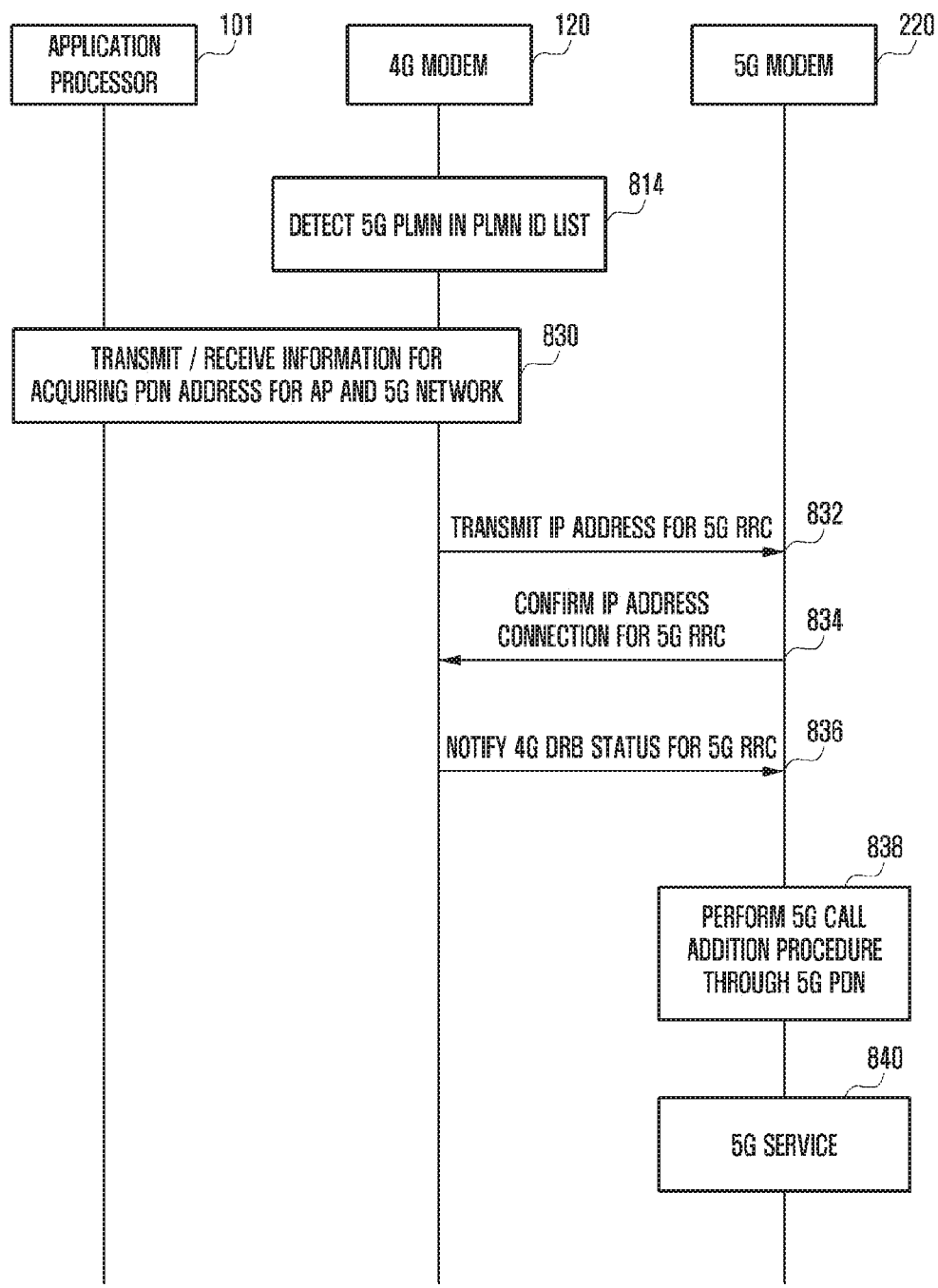
FIG. 8B is a more detailed signal flow diagram of the wireless communication device upon entering the 5G network in the 4G network according to the disclosure.

FIG. 8B is a more detailed signal flow diagram of the wireless communication device upon entering the 5G network in the 4G network according to the disclosure.

First, the 4G modem 120 may detect the PLMN of the 5G network in the PLMN ID list received from the 4G network in operation 814 as described in FIG. 8A. Then, as described above, the 4G modem 120 may acquire a PDN address to be used in the 5G network by transmitting and receiving information for acquiring a PDN address (for example, an IP address) for use in the application processor 101 and the 5G network in operation 830. The operation 830 may be performed in various forms, and the disclosure does not place any particular restriction on the procedure for obtaining the PDN address. Therefore, the 4G modem 120 may obtain the address of the PDN to be used in the application processor 101 and the 5G modem 220 in any manner.

After obtaining the PDN address from the application processor 101, the 4G modem 120 may transfer the RRC IP address for the RRC of the 5G network to the 5G modem 220 in operation 832. When the 5G modem 220 receives the RRC IP address to be used in the 5G network from the 4G modem 120, it may attempt to connect to the 5G network using the RRC address received in operation 834, and transmit the response signal to the 4G modem 120.

The 4G modem 120 may then notify the 4G DRB state for the 5G RRC in operation 836. An example of the DRB status notification message may be as shown in FIG. 9A.

Figure 9A:
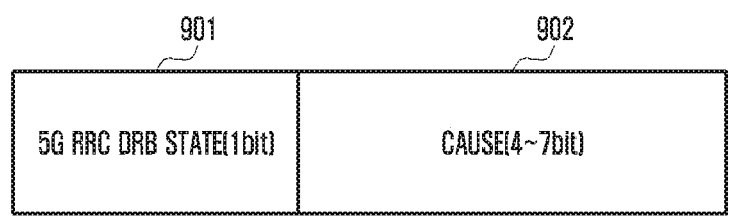
FIG. 9A is a diagram illustrating an example of a message transmitted from the 4G modem to the 5G modem of the wireless communication device according to the disclosure.

FIG. 9A is a diagram illustrating an example of a message transmitted from the 4G modem to the 5G modem of the wireless communication device according to the disclosure.

Referring to FIG. 9A, a 5G RRC DRB STATE information field 901 may be constituted by a cause field 902. As illustrated in FIG. 9A, the 5G RRC DRB STATE information field 901 may consist of one bit. If the 5G RRC DRB STATE information field 901 consists of one bit, the value may be represented as a value of '0' or '1'. For example, if the 5G RRC DRB STATE information field 901 has a value of '0', the RRC DRB is established. If the 5G RRC DRB STATE information field 901 has a value of '1', the RRC DRB is not set (Not Established). In addition, the definition of the value of the 5G RRC DRB STATE information field 901 may be reversed.

The CAUSE field 902 may describe, for example, the following information. First, the 5G RRC PDN Attach information may be described. Second, the 5G RRC PDN Detach information may be indicated. Third, if necessary, 4G RLF (Radio Link Failure) and Re-Establishment Failure information can be indicated as an option. Fourth, Inactivity Timer Expiry information may be indicated. Fifth, user-initiated 4G Release information may be indicated as an option when necessary.

The 4G modem 120 may notify the 4G DRB state for the 5G RRC having the information as described above in the operation 836. That is, the 4G modem 120 may instruct the 5G RRC DRB STATE field 901 to be set to a value of '0' to notify the establishment of the DRB, and notify the cause field 902 that the RRC PDN Attach procedure is the establishment cause so as to notify the establishment cause.

The 5G modem 220 may perform a 5G call addition procedure through the 5G PDN in operation 838. That is, the 5G modem 220 may enter a service state (In Service) by performing the 5G initial call addition or connection operation using the information received from the 4G modem 120. As described above, when the 5G modem 220 is connected to the 5G network in operation 838 and is in the service state, the 5G modem 220 may provide the 5G service to the user through the 5G network in operation 840. That is, the 5G modem 220 may access the 5G network and perform communication.

Figure 8C:
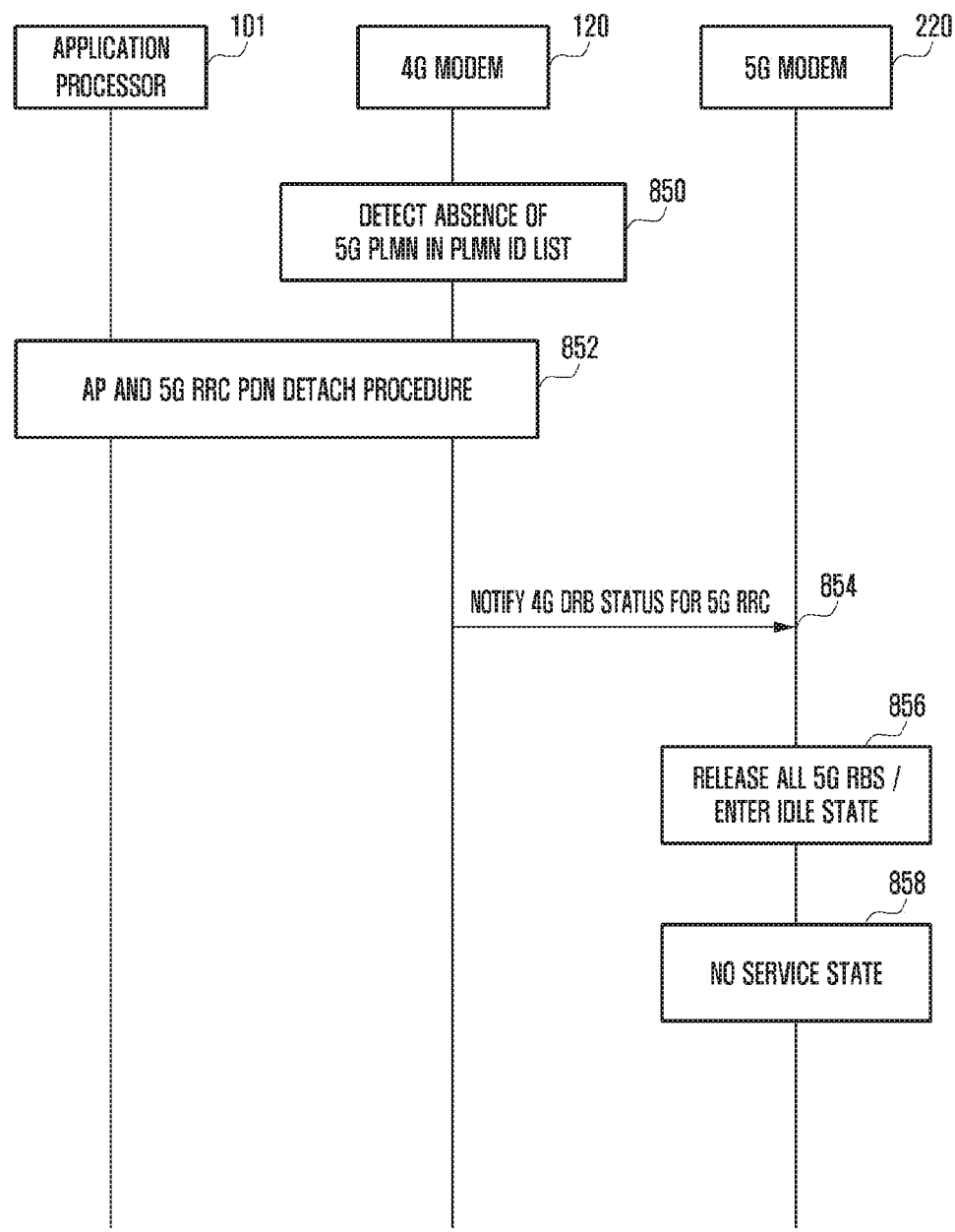
FIG. 8C is a signal flow diagram in the wireless communication device when separated in the 5G network according to the disclosure.

FIG. 8C is a signal flow diagram in the wireless communication device when separated in the 5G network according to the disclosure.

The operation of FIG. 8C is a state in which the service is being performed through the 5G modem 220, and the 4G modem 120 is connected to the 4G network to acquire necessary information for the 5G network. In this way, the 4G modem 120 may receive the PLMN ID list from the 4G network at a predetermined time or periodically, or in a specific case or non-periodically, while the 4G modem 120 and the 5G modem 220 are both being driven. Receiving the PLMN ID list in this manner may be the same operation as the operation 814 in FIGS. 8A and 8B described above. However, other parts of operation 850 different from the operations described above are that both the 4G modem 120 and the 5G modem 220 are communicate with each other and the 4G modem 120 does not have the PLMN ID of the 5G network in the PLMN ID list received from the 4G network. If the PLMN ID of the 5G network is not included in the PLMN ID list received from the 4G network, the wireless communication device can no longer communicate with the 5G network and should be switched to the 4G network. Accordingly, when the 4G modem 120 recognizes that the PLMN ID of the 5G network is not included in the PLMN ID list received from the 4G network, operation 852 informs the application processor 101 that the 5G modem 220 should not communicate with the 5G network. That is, the 4G modem 120 performs a detach procedure between the application processor 101 and the 5G RRC PDN in operation 852.

In accordance with this separation procedure, the application processor 101 recognizes that the wireless communication device no longer communicates with the 5G network, and can set or change the path for data transmission/reception in or from the 4G modem 120. For example, the application processor 101 may be in a state of performing data communication using only the 5G modem 220. In this case, the application processor 101 should change the setting to perform data communication via the 4G modem 120. In addition, the application processor 101 needs to perform the control necessary for the data communication by the 4G modem 120.

When the 4G modem 120 completes the detach procedure of the application processor 101 and the 5G RRC PDN in operation 852, the 4G modem 120 proceeds to operation 854 and can transmit the 4G DRB status notification message for the 5G RRC to the 5G modem 220. The DRB status notification message for RRC provided in operation 854 may use the message of FIG. 9A described above. For example, the 4G modem 120 may set the 5G RRC DRB STATE information field 901 to a value of '1', that is, the fact that the RRC DRB is not set (Not Established) in the notification message transmitted in operation 854, and the cause field 902 may be set to indicate 5G RRC PDN Detach information and transmitted.

Upon receiving the DRB status notification message for RRC provided in operation 854, the 5G modem 220 releases all 5G resources in operation 856 and enters an idle state. Therefore, in operation 858, the 5G modem 220 becomes "No Service" state in which the user data may not be serviced.

Figure 8D:
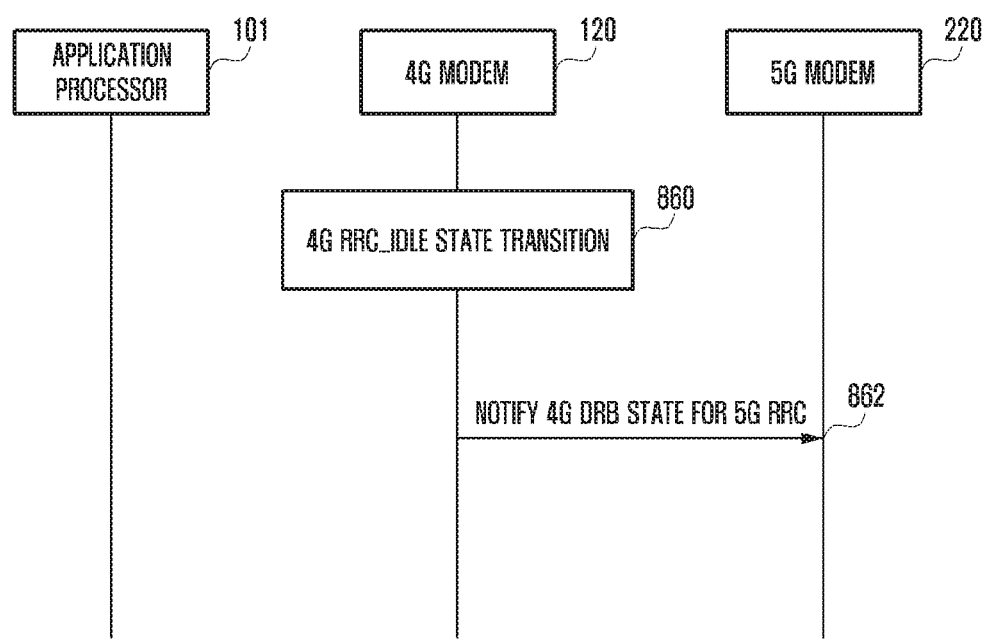
FIG. 8D is a signal flow diagram in the wireless communication device when the 4G modem transitions to an RRC idle state according to the disclosure.

FIG. 8D is a signal flow diagram in the wireless communication device when the 4G modem transitions to an RRC idle state according to the disclosure.

The state of FIG. 8D assumes a state in which the 5G modem 220 is driven and the service is in progress. As described above, the 5G network is configured to transmit the control information using the 4G network in order to provide the stability and reliability of signal. Therefore, the communication is actually made in the 5G network, but the 4G network should continuously keep the connected state to allow smooth communication in the 5G network.

In this situation, the 4G modem 120 may transition to the 4G RRC_IDLE state as in operation 860. The case in which the 4G modem 120 transits to the 4G RRC_IDLE state will be described for example as in operation 860. For example, the 4G modem 120 may have a 4G RRC state with a Radio Link Failure (RLF). This may occur when the wireless communication device is located at the edge of the 4G network or in a place where the received signal is very weak. As another example, the 4G modem 120 is specified to transition to the IDLE state when there is no data transmission/reception operation for a predetermined time. That is, the time set in the inactivity timer may expire.

Hereinafter, the case where the inactivity timer expires will be described as an example. As described above, when the communication with the 5G network is possible, the actual 4G modem 120 does not transmit/receive data through the 4G network, but detects only the control information for the 5G network. Thus, if the 5G modem 220 communicates over the 5G network, the inactivity timer of the 4G modem 120 may be driven. When the inactivity timer of the 4G modem 120 is driven and the inactivity timer expires, the 4G modem 120 transits to the RRC_IDLE state.

In this case, the 5G modem 220 can not acquire the control information from the 4G modem 120 and should recognize that can not obtained the control information from the 4G modem 120. Therefore, the 4G modem 120 may transmit the DRB status notification message for RRC to the 5G modem 220 in operation 862, thereby informing the RRC_IDLE state of the 4G modem 120. In operation 862, the case where the 4G modem 120 transmits the DRB status notification message for RRC to the 5G modem 220 will be described below with reference to the configuration of FIG. 9A.

When the 4G modem 120 transits to the 4G RRC_IDLE state, the RRC DRB STATE information field 901 may be set to a value of '1', that is, the fact that the RRC DRB is not set (Not Established) in order to indicate that the 4G network is not connected. In addition, the 4G modem 120 may also set the CAUSE field 902 to a value to indicate the 4G RLF state in each case or to a value indicating the inactivity timer expiration.

The 5G modem 220 may recognize that the 5G RRC message may no longer be received from the 4G modem 120 upon receiving the 4G DRB status notification message for the 5G RRC as described above in operation 862. The 5G modem 220 may then continue to communicate if it can receive the 5G RRC message from the 5G network. On the other hand, the 5G modem 220 may terminate the service if it can receive the 5G RRC message from the 5G network. That is, the data communication may not be performed.

Figure 8E:
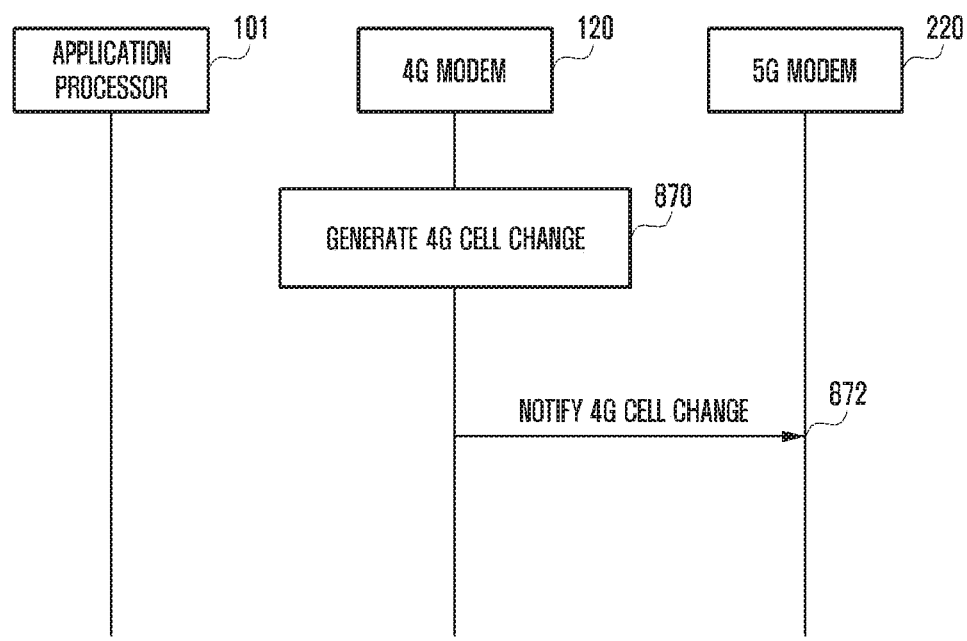
FIG. 8E is a signal flow diagram in the wireless communication device when a cell in the 4G modem network is changed according to the disclosure.

FIG. 8E is a signal flow diagram in the wireless communication device when a cell in the 4G modem network is changed according to the disclosure.

The state of FIG. 8E assumes a state in which the 5G modem 220 is driven and the service is in progress. As described above, the 5G network is configured to transmit the control information using the 4G network in order to provide the stability and reliability of signal. Therefore, although the communication is actually performed in the 5G network, since the control information of the 5G network is received from the 4G network only when the 4G network is continuously connected, the smooth communication may be achieved in the 5G network.

As described above, the 4G modem 120 may be connected to the 4G network, and a cell change in the 4G network may occur as in operation 870. There may be various types of cell changes in the 4G network. For example, the handover of the 4G network occurs or a reset failure event occurs after an RLF occurs.

The 4G modem 120 should inform the 5G modem 220 that the cell change in the 4G network has occurred as described above when the cell change in the 4G network occurs as in operation 870. This is because if the 4G network is changed, the 5G network is also changed. Referring to FIG. 7 described above, the base station of the 5G network exists in each base station of the 4G network in the form of smaller cells. Since the 5G network uses a very high frequency band compared to the 4G network, it is difficult to have a larger area than the base station area of the 4G network. Therefore, if the 4G network is changed, generally, the 5G network is also changed. Therefore, the 5G modem 220 also needs the cell addition operation.

Therefore, the 4G modem 120 may transmit the 4G cell change notification message to the 5G modem in operation 872 when the cell change occurs. The 4G cell change notification message will be described with reference to FIG. 9B.

Figure 9B:
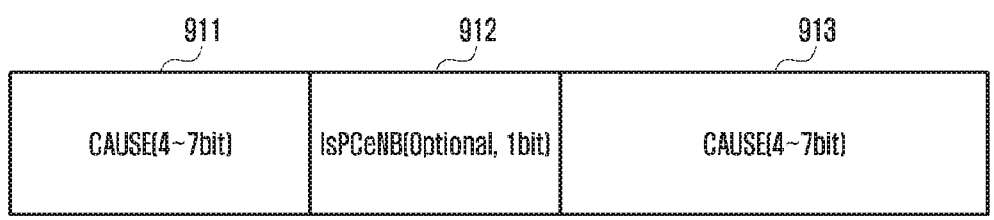
FIG. 9B is a diagram illustrating an example of the message transmitted from the 4G modem to the 5G modem of the wireless communication device according to the disclosure.

FIG. 9B is a diagram illustrating an example of the message transmitted from the 4G modem to the 5G modem of the wireless communication device according to the disclosure.

When the cell change in the 4G network occurs, the 4G modem 120 may generate and transmit a message as shown in FIG. 9B. The message illustrated in FIG. 9B has three fields. It may include identifier fields (4G Cell ID, PCI or ECI) 911 of the 4G cell and an IsPCeNB field 912 of the 4G cell. Finally, it may include a cause field 913.

Since the 4G cell identifier field 911 is already well known, a description thereof will be omitted. In addition, the IsPCeNB field 912 may be added if necessary, and the PCeNB means a 4G NB connected to 5G or recognizing a 5G function. In the case of performing the handover to the legacy eNB other than the PCeNB, the 5G DRB generation and the 5G RRC message may not be transmitted to the 4G DRB/SRB. In this case, the 5G RRC Dedicated PDN is detached. Finally, the cause field 913 is a field for identifying the reason why the cell change has occurred. Therefore, the cause field 913 may indicate information such as 4G RLF & Re-Establishment Failure in the case of handover as described above.

Referring again to FIG. 8E, upon receiving the 4G cell change notification message from the 4G modem 120 in operation 872, the 5G modem 220 may perform an operation for adding a cell or changing a 5G network.

Figure 8F:
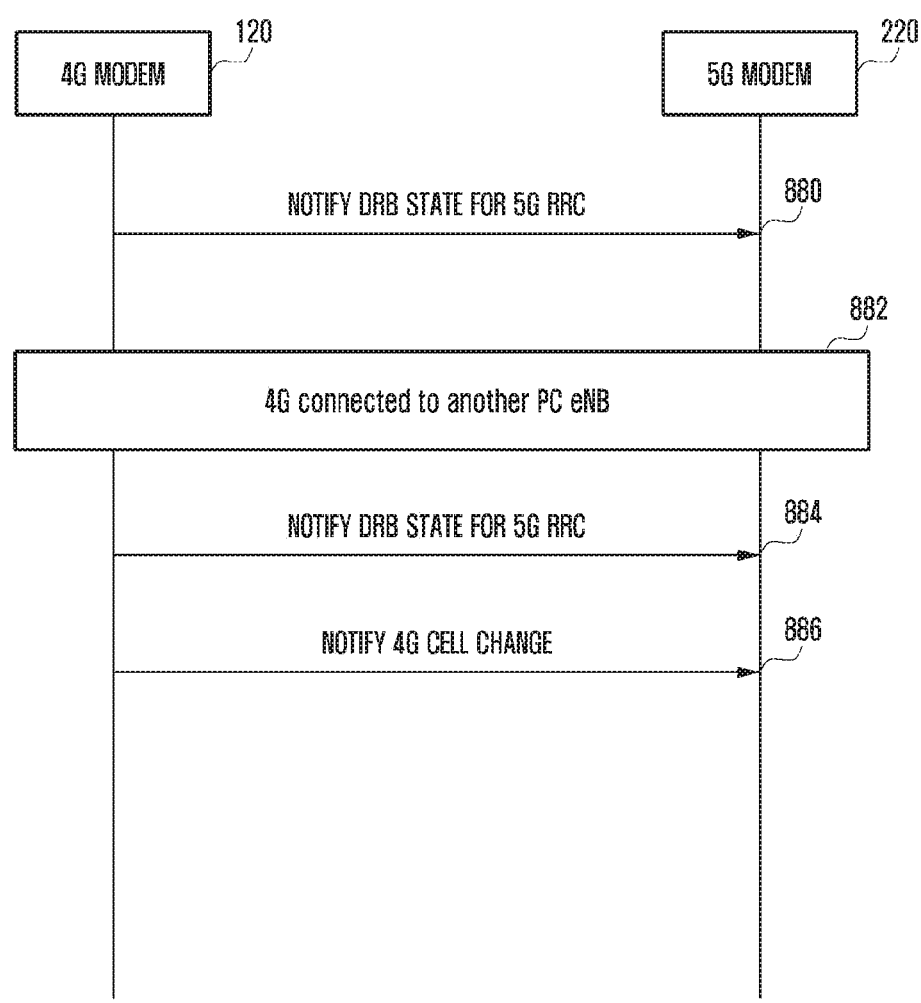
FIG. 8F is a signal flow diagram in the wireless communication device when the wireless communication device according to the disclosure is disconnected from the 4G network.

FIG. 8F is a signal flow diagram in the wireless communication device when the wireless communication device according to the disclosure is disconnected from the 4G network.

As described above, when the 5G network and the 4G network are mixed, when the RRC message of the 5G network is transmitted through the 4G network, the state of the 4G network becomes a very important factor. Thus, if the RLF of the 4G modem 120 occurs and thereafter fails to re-establish, the 5G modem communicating with the 5G network should also be aware of this. Accordingly, the procedure made in this situation will be described with reference to FIG. 8F of the disclosure.

When the 4G modem 120 receives the RLF as described above and then fails to re-establish the RRC, the RRC state transits to the RRC IDLE state, thereby releasing the 4G DRB for the 5G RRC and informing the 5G modem 220 thereof. Therefore, the 4G modem 120 transmits the DRB state notification message for the 5G RRC in operation 880. At this time, the DRB state notification message for 5G RRC may use the message of FIG. 9A as described above. Accordingly, the 5G RRC DRB STATE field 901 may be set to indicate Not Established, and the cause field 902 may be set to indicate 4G RLF & Re-Establishment Failure.

Thereafter, the 4G modem 120 can connect to another PC eNB (5G Capable 4G eNB) as in operation 882. Here, the PC eNB means an eNB of the 4G network capable of recognizing the 5G network.

At this time, the 5G modem 220 checks the quality of the 5G link and transmits the 5G RRC message through the 5G SRB without transmitting the 5G RRC message to the 4G SRB/DRB when the quality of the 5G link is good for performing the communication. If the 5G modem 220 directly transmits the SRB, the 5G modem 220 does not switch the 4G modem 120 and the data path. In addition, the generation of 5G SRB can be used together with the generation of another radio bearer in the initial connection process, and may be generated only when 4G RLF is generated. As another example, when it is connected to another 4G network, i.e., a specific cell of the 4G after the 4G RLF, a 5G cell addition process may be newly performed.

On the other hand, when the quality of the 5G link is poor (5G link quality) or when the 5G RLF occurs, the 5G modem 220 may transmit a data path switching (Data Path Switching) notification message to the 4G modem 120 serving as a host. Accordingly, not only the 5G modem 220 but also the 4G modem 120 can suspend all the 5G DRBs. In addition, when it is connected to another 4G cell after the 4G FRL, the 5G cell addition process can be newly performed.

As described above, the 5G modem 220 may transmit/receive the control signal through the 5G network when the 5G network is in a good state for transmitting/receiving the control signal, that is, when the signal quality with the 5G network is higher than a preset threshold value. On the other hand, the 5G modem 220 can transmit/receive signals through the 4G network when the quality is less than a preset threshold value.

After operation 882, the 4G modem 120 can notify the 5G modem 220 that the 4G DRB for the 5G RRC is generated again and the 5G RRC may be transmitted again like operation 884. At this time, the DRB status notification message for 5G RRC may use the message of FIG. 9B described above.

In the message of FIG. 9B, the 4G modem 120 includes the identifier of the 4G cell in the identifier fields (4G Cell ID, PCI or ECI) 911 of the newly connected 4G cell, and may set the value of the IsPCeNB field 912 to 'True' (CAUSE), and finally indicate a CAUSE field 913 to 4G RLF & Re-Establishment Failure. Since the cell change of the 4G modem 120 occurs in operation 886, the 4G modem 120 may transmit the cell change notification message to the 5G modem 220. This allows the 5G modem 220 to be in the connection to the 5G network again.

Figure 8G:
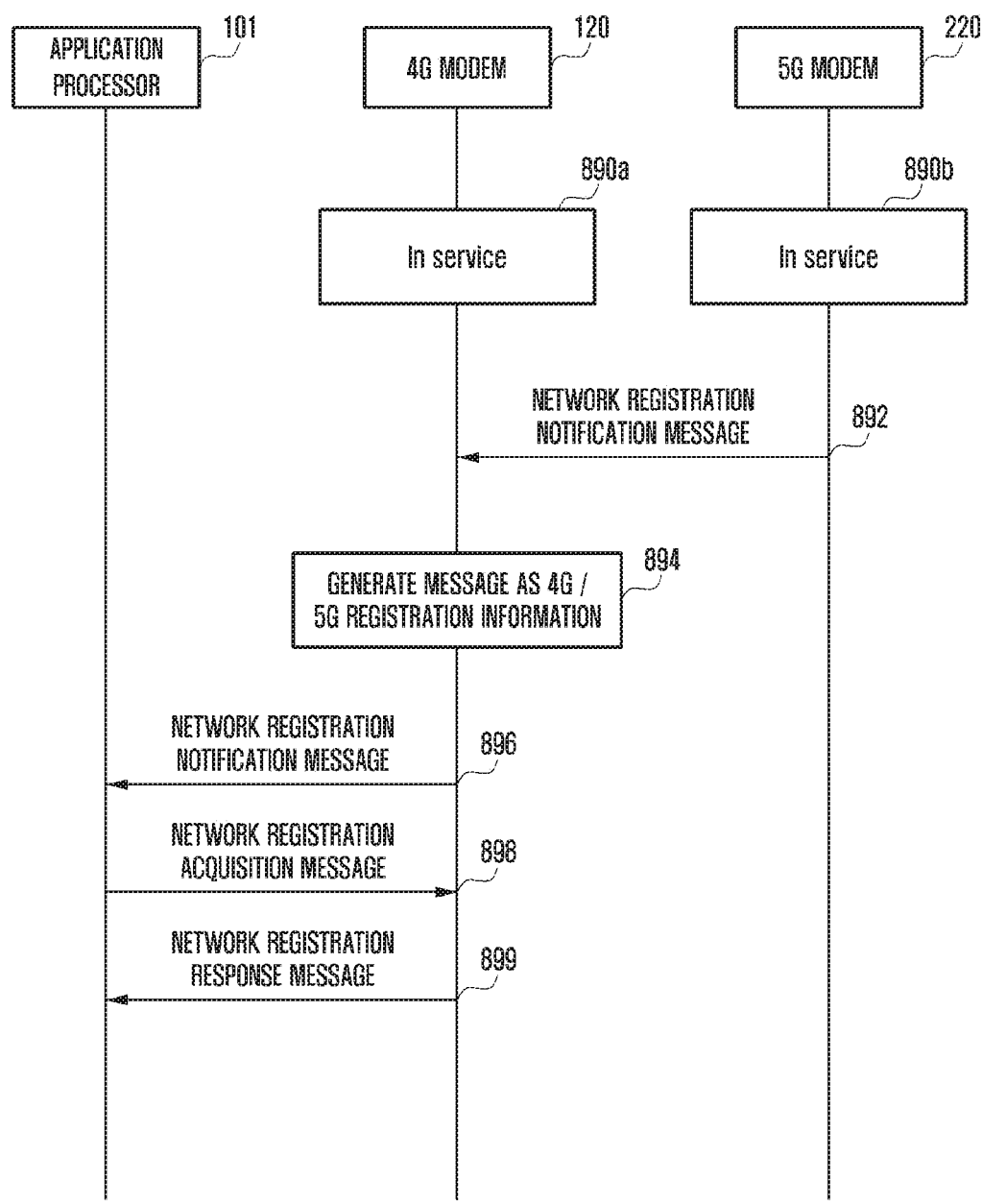
FIG. 8G is a signal flow diagram in the wireless communication device when connected to the 4G network and the 5G network in the wireless communication device according to the disclosure.

FIG. 8G is a signal flow diagram in the wireless communication device when connected to the 4G network and the 5G network in the wireless communication device according to the disclosure.

Describing in more detail, FIG. 8G illustrates the internal signal flow diagram in the case where the 5G modem shares the control channel between the 4G modem and the AP without having the inter-chip control information channel separate from the AP. The control signals generated by the 5G modem are first transmitted to the 4G modem, and is transferred to the inter-chip control channel between the 4G and the AP or is formatted and transmitted to the AP.

The 4G modem 120 and the 5G modem 220 illustrate cases where both operation 890*a* and operation 890*b* are in a service state. In the wireless communication device according to the disclosure, the 4G modem 120 first enters the service state, and then the 5G modem 220 enters the service state. The 5G modem 220 is in the service state because the 5G modem 220 accesses the 5G network, receives the RRCConnectionRrconfiguration message from the base station, successfully receives all the random access channels (RACH), and provides the user service through the 5G DRB.

When the 5G modem 220 enters the service state, the 5G modem 220 may generate a network registration notification message in operation 892 and transmit the message to the 4G modem 120. The network registration notification message transmitted in operation 892 may include a reference signal received power (RSRP), a physical cell identifier (PCI), and tracking area code (TAC) information.

When the 4G modem 120 receives the network registration notification message from the 5G modem 220 in operation 892, the 4G modem 120 generates the same information of the 4G network as the information included in the message and the information received from the 5G modem 220 as one message in operation 894. Then, the 4G modem 120 may transmit the network registration notification message to the application processor 101 in operation 896.

Upon receiving the network registration notification message, the application processor 101 stores the message and transmits the network registration acquisition (Get Net Registration) message to the 4G modem in operation 898. Accordingly, the 4G modem 120 may generate a network registration response message in operation 899 and transmit the generated response message to the application processor 101.

The embodiments of the disclosure disclosed in the present specification and the accompanying drawings have been provided only as specific examples in order to assist in understanding the disclosure and do not limit the scope of the disclosure. Therefore, it is to be construed that in addition to the embodiments of the disclosure, all modifications or alternations derived based on a technical spirit of the disclosure are included in the scope of the disclosure. For example, although FIGS. 8A to 8G are intended to illustrate various aspects, it is not possible to illustrate all the forms that make up a core with magnetic materials, and various modifications may be made without departing from the spirit and scope of the disclosure.

INDUSTRIAL APPLICABILITY

The disclosure can be used when one electronic device communicates in different frequency bands.

The invention claimed is:

1. An electronic device, comprising:
   a first wireless module configured to up-convert a baseband signal to be transmitted according to a first wireless standard into a signal of a first frequency band and transmitting the signal to a first antenna, and converting the signal of the first frequency band received from the first antenna into the signal of the baseband and outputting the signal;
   a second wireless module configured to up-convert a baseband signal to be transmitted according to a second wireless standard into a signal of a second frequency band and transmitting the signal to a second antenna, and converting the signal of the second frequency band received from the second antenna into the signal of the baseband and outputting the signal;
   a first communication processor configured to modulate and encode data to be transmitted to the first wireless module to generate the baseband signal to be transmitted and demodulate and decode the baseband signal received from the first wireless module;
   a second communication processor configured to modulate and encode data to be transmitted to the second wireless module to generate the baseband signal to be transmitted and demodulate and decode the baseband signal received from the second wireless module; and
   a data communication interface configured to transmit and receive data between the first communication processor and the second communication processor,
   wherein the first communication processor controls the second communication processor to be turned on/off based on system information of a second wireless standard mode on data received from a system of a first wireless standard mode.

2. The electronic device of claim 1, wherein the first communication processor transfers control information to be used in the system of the second wireless standard mode to a second communication processor through the second data communication interface when the control information to be used in the system of the second wireless standard mode is included in the data received from the system of the first wireless standard mode in a state where the second communication processor is turned on.

3. The electronic device of claim 2, wherein the control information to be used in the system of the second wireless standard mode includes at least one of an Internet protocol (IP) address, a data radio bearer (DRB) of the first wireless standard mode for upper signaling of the second wireless standard mode, signaling radio bearer (SRB), cell change notification information of the first wireless standard mode which are to be used in the system of the second wireless standard mode.

4. The electronic device of claim 1, wherein when the second communication processor transmits a control information of the second wireless standard mode, the second communication processor controls to transmit the control information through the second wireless module if communication quality between the second communication processor and the system of the second wireless standard mode is equal to or more than a preset value.

5. The electronic device of claim 1, wherein when the second communication processor transmits a control information of the second wireless standard mode, the second communication processor controls to transmit the control information of the second wireless standard to the first communication processor through the data communication interface if communication quality between the second communication processor and the system of the second wireless standard mode is less than a preset value, and
   the first communication processor controls to transmit the control information of the second wireless standard through the first wireless module.

6. The electronic device of claim 1, wherein the data communication interface is a direct general-purpose asynchronous receiver/transmitter (UART) interface.

* * * * *